United States Patent
Nozawa

(10) Patent No.: US 9,902,380 B2
(45) Date of Patent: Feb. 27, 2018

(54) SADDLE-STRADDLING TYPE MOTOR VEHICLE AND WHEEL FORCE ACQUISITION DEVICE

(71) Applicant: YAMAHA HATSUDOKI KABUSHIKI KAISHA, Iwata-shi (JP)

(72) Inventor: Hisayuki Nozawa, Shizuoka (JP)

(73) Assignee: YAMAHA HATSUDOKI KABUSHIKI KAISHA, Iwata-Shi, Shizuoka-Ken (JP)

( * ) Notice: Subject to any disclaimer, the term of this patent is extended or adjusted under 35 U.S.C. 154(b) by 519 days.

(21) Appl. No.: 14/529,557

(22) Filed: Oct. 31, 2014

(65) Prior Publication Data
US 2015/0127240 A1    May 7, 2015

(30) Foreign Application Priority Data

Nov. 1, 2013    (JP) .................................. 2013-228503

(51) Int. Cl.
| | | |
|---|---|---|
| *B60G 17/00* | (2006.01) | |
| *B60T 8/175* | (2006.01) | |
| *B60K 28/02* | (2006.01) | |
| *B60T 8/17* | (2006.01) | |
| *B60W 10/06* | (2006.01) | |
| *B60W 10/188* | (2012.01) | |

(Continued)

(52) U.S. Cl.
CPC .............. *B60T 8/175* (2013.01); *B60K 28/02* (2013.01); *B60T 8/17* (2013.01); *B60T 8/1706* (2013.01); *B60W 10/06* (2013.01); *B60W 10/188* (2013.01); *B60W 30/045* (2013.01); *B62K 5/027* (2013.01); *B62K 11/04* (2013.01); *B60T 2210/22* (2013.01); *B60T 2230/03* (2013.01); *B62K 2207/02* (2013.01)

(58) Field of Classification Search
CPC . B60T 8/1706; B60T 2230/03; B60T 8/17554
USPC .......................................................... 701/70
See application file for complete search history.

(56) References Cited

U.S. PATENT DOCUMENTS

| | | | |
|---|---|---|---|
| 2005/0080543 A1* | 4/2005 | Lu ........................ | B60G 17/018 701/70 |
| 2009/0084623 A1* | 4/2009 | Dagenais .............. | B60T 8/1706 180/210 |

(Continued)

FOREIGN PATENT DOCUMENTS

| | | |
|---|---|---|
| JP | 2004-099026 A | 4/2004 |
| JP | 2006-062505 A | 3/2006 |

(Continued)

OTHER PUBLICATIONS

Japanese Office Action dated Jul. 28, 2015.
Extended European Search Report dated Sep. 16, 2015.

*Primary Examiner* — Redhwan K Mawari
(74) *Attorney, Agent, or Firm* — Rabin & Berdo, P.C.

(57) ABSTRACT

A saddle-straddling type motor vehicle on which an object is loadable for traveling with the motor vehicle. The motor vehicle includes a main body having a wheel, a motor that generates driving force for moving the main body, a wheel force calculator configured to calculate wheel force exerted between the wheel and a surface of a road on which the motor vehicle is traveling, and a wheel force corrector configured to correct the wheel force calculated by the wheel force calculator based on a condition of the object loaded on the motor vehicle.

17 Claims, 19 Drawing Sheets

(51) Int. Cl.
*B60W 30/045* (2012.01)
*B62K 5/027* (2013.01)
*B62K 11/04* (2006.01)

(56) References Cited

U.S. PATENT DOCUMENTS

| | | | | |
|---|---|---|---|---|
| 2011/0172881 A1* | 7/2011 | Seidel | ............... | B60T 8/1706 701/37 |
| 2012/0283929 A1* | 11/2012 | Wakita | ............... | A61G 5/04 701/99 |
| 2014/0200780 A1* | 7/2014 | Watanabe | ............ | B60T 8/1706 701/68 |

FOREIGN PATENT DOCUMENTS

| | | | |
|---|---|---|---|
| JP | 2007-523780 A | | 8/2007 |
| JP | 2008-087724 A | | 4/2008 |
| JP | 2009-241721 A | | 10/2009 |
| JP | 2011-079419 A | | 4/2011 |
| JP | 5007549 B2 | | 8/2012 |
| WO | WO 2010/082288 A1 | | 7/2010 |
| WO | WO-2013/014945 A1 | | 1/2013 |

* cited by examiner

FRONT WHEEL

REAR WHEEL

FRONT WHEEL

REAR WHEEL

FRONT WHEEL

REAR WHEEL

FRONT WHEEL

REAR WHEEL

FRONT WHEEL

REAR WHEEL

SADDLE-STRADDLING TYPE MOTOR VEHICLE AND WHEEL FORCE ACQUISITION DEVICE

BACKGROUND OF THE INVENTION

Field of the Invention

The present invention relates to a saddle-straddling type motor vehicle and a wheel force acquisition device.

Description of Related Art

There is a technique that controls the travel of a vehicle based on the force exerted between a wheel and a road surface. In a motorcycle described in WO 2013/014945 A1, skid motion acceleration is detected based on a vehicle speed, a bank angle, acceleration in a transverse direction and a yaw rate. When the detected skid motion acceleration is not less than a predetermined threshold value, it is determined that a skid motion is taking place at the wheel. In this case, the driving force or the braking force of the motorcycle is controlled such that the longitudinal force exerted on the wheel decreases.

BRIEF SUMMARY OF THE INVENTION

However, the transverse force and the longitudinal force that generate the skid motion acceleration differ depending on mass, posture and the like of a rider. The transverse force and the longitudinal force cannot be accurately detected by a method described in WO 2013/014945 A1.

The embodiments of the present invention provide a saddle-straddling type motor vehicle and a wheel force acquisition device that can acquire appropriate wheel force.

(1) A saddle-straddling type motor vehicle according to one aspect of the embodiments of the present invention that travels with an additional object including at least a rider being loaded includes a main body having a wheel, a motor that generates driving force for moving the main body, a wheel force calculator that calculates wheel force exerted between the wheel and a road surface, and a wheel force corrector that corrects the wheel force calculated by the wheel force calculator based on a condition of the additional object.

In this saddle-straddling type motor vehicle, the driving force is generated by the motor, and the main body is moved by the driving force. During the movement of the main body, the wheel force exerted between the wheel of the main body and the road surface is calculated by the wheel force calculator. The calculated wheel force is corrected by the wheel force corrector based on the condition of the additional object including at least the rider. Thus, the appropriate wheel force corresponding to the condition of the additional object is acquired.

(2) The condition of the additional object may include posture of the rider in a front-to-rear direction. The wheel force corrector may estimate air resistance based on the posture of the rider in the front-to-rear direction, and may correct the calculated wheel force based on the estimated air resistance.

The air resistance differs depending on the posture of the rider in the front-to-rear direction. For example, the larger the tilt angle of the upper half of the body of the rider is, the smaller the air resistance is. The wheel force differs due to the difference in the air resistance. Therefore, the air resistance is estimated based on the posture of the rider in the front-to-rear direction, and the wheel force is corrected based on the estimated air resistance. Thus, the appropriate wheel force corresponding to the posture of the rider in the front-to-rear direction is acquired.

(3) The wheel force corrector may estimate a height of a center of aerodynamic force based on the posture of the rider in the front-to-rear direction, and may correct the calculated wheel force based on the estimated height of the center of aerodynamic force and the estimated air resistance.

A relation between the air resistance and the wheel force differs depending on the height of the center of aerodynamic force. Therefore, the height of the center of aerodynamic force is estimated based on the posture of the rider in the front-to-rear direction, and the wheel force is corrected based on the estimated height of the center of aerodynamic force and the estimated air resistance. Thus, the appropriate wheel force corresponding to the posture of the rider in the front-to-rear direction is acquired.

(4) The saddle-straddling type motor vehicle may further include an acceleration detector that detects acceleration of the main body, wherein the wheel force corrector may estimate the posture of the rider in the front-to-rear direction based on the acceleration detected by the acceleration detector, and may correct the calculated wheel force based on the estimated posture of the rider in the front-to-rear direction.

There is a correlation between the posture of the rider in the front-to-rear direction and the acceleration of the main body. For example, the larger the acceleration of the main body is, the larger the tilt angle of the upper half of the body of the rider is likely to be. Therefore, the posture of the rider in the front-to-rear direction is estimated based on the acceleration detected by the acceleration detector. Thus, it is possible to perform the correction of the wheel force based on the posture of the rider in the front-to-rear direction without complicating the configuration.

(5) The saddle-straddling type motor vehicle may further include a vehicle speed detector that detects a speed of the main body, wherein the wheel force corrector may estimate the posture of the rider in the front-to-rear direction based on the speed detected by the vehicle speed detector, and may correct the calculated wheel force based on the estimated posture of the rider in the front-to-rear direction.

There is a correlation between the posture of the rider in the front-to-rear direction and the speed of the main body. For example, the higher the speed of the main body is, the larger the tilt angle of the upper half of the body of the rider is likely to be. Therefore, the posture of the rider in the front-to-rear direction is estimated based on the speed detected by the vehicle speed detector. Thus, it is possible to perform the correction of the wheel force based on the posture of the rider in the front-to-rear direction without complicating the configuration.

(6) The saddle-straddling type motor vehicle may include a posture entry unit in which the posture of the rider in the front-to-rear direction is entered, wherein the wheel force corrector may correct the calculated wheel force based on the posture of the rider in the front-to-rear direction that is entered in the posture entry unit.

In this case, it is possible to easily perform the correction of the wheel force based on the posture of the rider in the front-to-rear direction that is entered in the posture entry unit.

(7) The condition of the additional object may include mass of the additional object, and the wheel force corrector may correct the calculated wheel force based on the mass of the additional object.

The wheel force differs depending on the mass of the additional object. Therefore, the wheel force is corrected based on the mass of the additional object. Thus, the appropriate wheel force corresponding to the mass of the additional object is acquired.

(8) The wheel force corrector may estimate a position of a center of gravity of an entirety including the saddle-straddling type motor vehicle and the additional object based on the mass of the additional object, and may correct the calculated wheel force based on the estimated position of the center of gravity.

There is a constant correlation between the mass of the additional object and the position of the center of gravity. For example, when the number of the riders or the mass of the loaded object increases, the position of the center of gravity moves in a rearward direction. Therefore, the position of the center of gravity of the entirety including the saddle-straddling type motor vehicle and the additional object is estimated based on the mass of the additional object. Thus, it is possible to perform the correction of the wheel force based on the position of the center of gravity without complicating the configuration.

(9) The saddle-straddling type motor vehicle may further include a driving force detector that detects the driving force generated by the motor, and an acceleration detector that detects acceleration of the main body, wherein the wheel force corrector may estimate the mass of the additional object based on the driving force detected by the driving force detector and the acceleration detected by the acceleration detector, and may correct the calculated wheel force based on the estimated mass of the additional object.

There is a correlation among the driving force generated by the motor, the acceleration of the main body and the mass of the additional object. Therefore, the mass of the additional object is estimated based on the driving force detected by the driving force detector and the acceleration detected by the acceleration detector. Thus, it is possible to perform the correction of the wheel force based on the mass of the additional object without complicating the configuration.

(10) The saddle-straddling type motor vehicle may further include a load detector that detects a load applied to the wheel, and an acceleration detector that detects acceleration of the main body, wherein the wheel force corrector may estimate the mass of the additional object based on the load detected by the load detector and the acceleration detected by the acceleration detector, and may correct the calculated wheel force based on the estimated mass of the additional object.

There is a correlation among the load applied to the wheel, the acceleration of the main body and the mass of the additional object. Therefore, the mass of the additional object is estimated based on the load detected by the load detector and the acceleration detected by the acceleration detector. Thus, it is possible to perform the correction of the wheel force based on the mass of the additional object without complicating the configuration.

(11) The saddle-straddling type motor vehicle may further include a mass entry unit in which the mass of the additional object is entered, wherein the wheel force corrector may correct the calculated wheel force based on the mass of the additional object entered in the mass entry unit.

In this case, it is possible to easily perform the correction of the wheel force based on the mass of the additional object entered in the mass entry unit.

(12) The condition of the additional object may include posture of a rider in a transverse direction, and the wheel force corrector may estimate a position of a center of gravity of the entirety including the saddle-straddling type motor vehicle and the additional object based on the posture of the rider in the transverse direction, and corrects the calculated wheel force based on the estimated position of the center of gravity.

The position of the center of the gravity of the entirety including the saddle-straddling type motor vehicle and the additional object differs depending on the posture of the rider in the transverse direction. The wheel force differs due to the difference in the position of the center of gravity. Therefore, the position of the center of gravity is estimated based on the posture of the rider in the transverse direction, and the wheel force is corrected based on the estimated position of the center of gravity. Thus, the appropriate wheel force corresponding to the posture of the rider in the transverse direction is acquired.

(13) The saddle-straddling type motor vehicle may further include a road surface information acquirer that acquires road surface information regarding the road surface, wherein the wheel force corrector may estimate the posture of the rider in the transverse direction based on the road surface information acquired by the road surface information acquirer, and may correct the calculated wheel force based on the estimated posture of the rider in the transverse direction.

There is a constant correlation between the condition of the road surface and the posture of the rider in the transverse direction. For example, when the main body turns on an unpaved poor road such as a mountainous region, the tilt of the rider in the transverse direction is likely to be small, and when the main body turns on a paved general road or a racetrack, the tilt of the rider in the transverse direction is likely to be large. Therefore, the posture of the rider in the transverse direction is estimated based on the road surface information acquired by the road surface information acquirer. Thus, it is possible to perform the correction of the wheel force based on the posture of the rider in the transverse direction without complicating the configuration.

(14) The wheel force corrector may estimate a bank angle of an entirety including the saddle-straddling type motor vehicle and the additional object, and an amount of load movement in the entirety including the saddle-straddling type motor vehicle and the additional object, based on the condition of the additional object, and may correct the calculated wheel force based on the bank angle and the amount of load movement that are estimated.

In this case, the appropriate wheel force corresponding to the condition of the additional object is easily acquired based on the bank angle and the amount of load movement that are estimated.

(15) The wheel force calculator may calculate perpendicular force exerted in a direction perpendicular to the road surface and horizontal force exerted in a direction parallel to the road surface as the wheel force, and the saddle-straddling type motor vehicle may further include a movement controller that sets a friction circle based on the perpendicular force of the corrected wheel force, and may control a movement of the main body such that the horizontal force of the corrected wheel force does not exceed a range indicated by the friction circle.

In this case, the appropriate perpendicular force and horizontal force corresponding to the condition of the additional object are acquired. Further, the friction circle can be appropriately set based on the corrected perpendicular force. Thus, the movement of the main body can be controlled such that the grip of the wheel is maintained.

(16) A wheel force acquisition device according to another aspect of the embodiments of the present invention for acquiring wheel force of a saddle-straddling type motor vehicle that travels with an additional object including at least a rider being loaded, wherein a wheel force calculator that calculates wheel force exerted between a wheel of the saddle-straddling type motor vehicle and a road surface, and a wheel force corrector that corrects the wheel force calculated by the wheel force calculator based on a condition of the additional object.

In this wheel force acquisition device, the wheel force of the saddle-straddling type motor vehicle is calculated by the wheel force calculator. The calculated wheel force is corrected by the wheel force corrector based on the condition of the additional object including at least the rider. Thus, the appropriate wheel force corresponding to the condition of the additional object is acquired.

Other features, elements, characteristics, and advantages of the present invention will become more apparent from the following description of preferred embodiments of the present invention with reference to the attached drawings.

DESCRIPTION OF THE PREFERRED EMBODIMENTS

A motorcycle will be described below as one example of a saddle-straddling type motor vehicle according to embodiments of the present invention with reference to drawings.

(1) Configuration of Motorcycle

Figure 1:
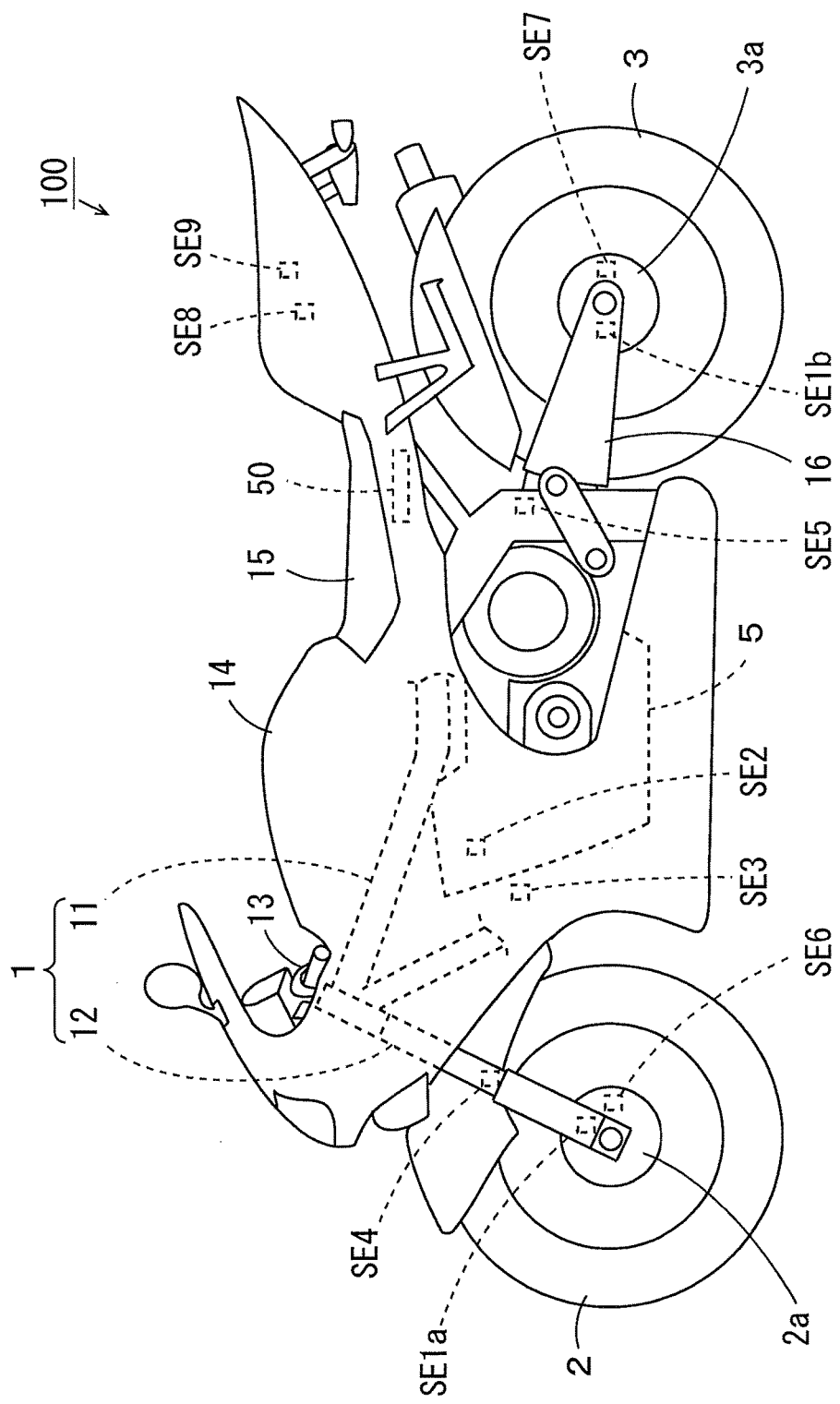
FIG. 1 is a schematic side view showing the configuration of a motorcycle according to the present embodiment.

FIG. 1 is a schematic side view showing the configuration of the motorcycle according to the present embodiment. The motorcycle 100 of FIG. 1 includes a main body 1. The main body 1 includes a body frame 11 and a front fork 12. The front fork 12 is attached to the front end of the body frame 11 to be swingable to the right and left. The front fork 12 is telescopable and functions as a front suspension. A handle 13 is provided at the upper end of the front fork 12, and a front wheel 2 is attached to the lower end of the front fork 12 to be rotatable.

A wheel rotation speed sensor SE1a and a stroke sensor SE4 are attached to the front fork 12. The wheel rotation speed sensor SE1a detects a rotation speed of the front wheel 2. A moving speed (a vehicle speed) of the main body 1 is acquired from a result of the detection of the wheel rotation speed sensor SE1a. The stroke sensor SE4 detects an amount of extension and contraction of the front fork 12 as an amount of stroke of the front suspension.

An engine 5 is arranged at substantially the center of the body frame 11. An engine rotation speed sensor SE2 for detecting a rotation speed of the engine 5 is provided at the engine 5. A throttle opening sensor SE3 is provided at a throttle valve 5a (see below-mentioned FIG. 3) that controls an amount of intake of the engine 5. The throttle opening sensor SE3 detects an opening of the throttle valve 5a (a degree of throttle opening).

A swing arm 16 and a stroke sensor SE5 are provided behind the engine 5. The swing arm 16 is swingable with respect to the body frame 11 and functions as a rear suspension. A rear wheel 3 is attached to the rear end of the swing arm 16 to be rotatable. A torque (rotational force) generated by the engine 5 is transmitted to the rear wheel 3, so that the rear wheel 3 is driven. The stroke sensor SE5 detects an amount of swing of the swing arm 16 as an amount of stroke of the rear suspension.

A wheel rotation speed sensor SE1b is provided at the swing arm 16. The wheel rotation speed sensor SE1b detects a rotation speed of the rear wheel 3. A reduction gear ratio by a transmission (not shown) is acquired from a result of the detection of each of the engine rotation speed sensor SE2 and the wheel rotation speed sensor SE1b. Further, the vehicle speed may be acquired from the result of the detection of the wheel rotation speed sensor SE1b.

A brake 2a is provided at the front wheel 2, and a brake 3a is provided at the rear wheel 3. When a brake lever 44 (FIG. 2), described below, is operated, the front wheel 2 is braked by the brake 2a. Further, when a footbrake (not shown) is operated, the rear wheel 3 is braked by the brake 3a.

A brake sensor SE6 is provided at the brake 2a, and a brake sensor SE7 is provided at the brake 3a. The brake sensor SE6 detects the braking force of the front wheel 2 by the brake 2a, and the brake sensor SE7 detects the braking force of the rear wheel 3 by the brake 3a. For example, each of the brake sensors SE6, SE7 detects the braking force based on oil pressure for driving each of the brakes 2a, 3a.

When the motorcycle 100 includes an antilock brake system (ABS), the braking force of each of the front wheel 2 and the rear wheel 3 may be detected based on a control value of each of the brakes 2a, 3a by the antilock brake system instead of the use of the brake sensors SE6, SE7. Alternatively, a sensor that detects an amount of operation of each of the brake lever 44 and the footbrake may be provided, and the braking force of each of the front wheel 2 and the rear wheel 3 may be detected based on a result of the detection of each of these sensors.

A fuel tank 14 is provided above the engine 5, and a seat 15 is provided behind the fuel tank 14. An ECU (Electronic Control Unit) 50, an acceleration sensor SE8 and a tilt angle sensor SE9 are provided above the rear wheel 3.

Here, a plane including the center of the body frame 11 in a width direction, the center of the front wheel 2 in the width direction and the center of the rear wheel 3 in the width direction is referred to as a vehicle center surface. A direction parallel to the vehicle center surface and a horizontal plane is defined as a front-to-rear direction, a direction perpendicular to the horizontal plane is defined as an up-and-down direction, and a direction perpendicular to the vehicle center surface is defined as a transverse direction.

The acceleration sensor SE8 detects acceleration of the main body 1. The tilt angle sensor SE9 is a gyro sensor, for example, and detects a tilt angle of the motorcycle 100. The tilt angle of the motorcycle 100 means an angle formed by the vehicle center surface with respect to a vertical direction, and a bank angle of the motorcycle 100 means an angle formed by the vehicle center surface with respect to a direction perpendicular to a road surface. When the road surface is horizontal, the bank angle of the motorcycle 100 coincides with the tilt angle of the motorcycle 100.

Figure 2:
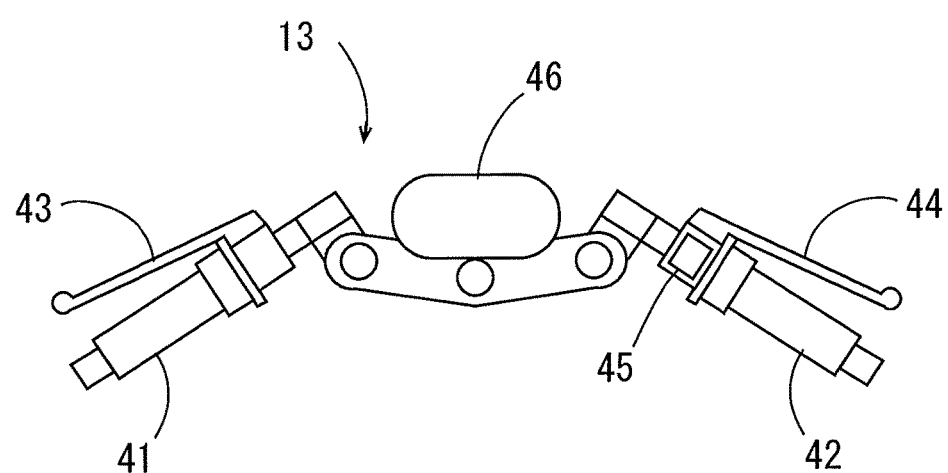
FIG. 2 is a schematic top view showing a handle of the motorcycle and its peripheral portions.

FIG. 2 is a schematic top view showing the handle 13 of the motorcycle 100 and its peripheral portions. A fixed grip 41 is provided at a left portion of the handle 13, and an accelerator grip 42 is provided at a right portion of the handle 13. The accelerator grip 42 is provided to be rotatable in a predetermined range of a rotation angle. The throttle opening is adjusted by the operation of the accelerator grip 42. Thus, the driving force of the engine 5 of FIG. 1 is adjusted.

A clutch lever 43 for disengaging a clutch (not shown) is provided in front of the fixed grip 41. The brake lever 44 for operating the brake 2a of FIG. 1 is provided in front of the accelerator grip 42. A starter switch 45 for starting the engine 5 of FIG. 1 is provided to be adjacent to the accelerator grip 42.

A display 46 is provided at the center of the handle 13. The display 46 displays various information regarding the travel of the motorcycle 100. For example, the display 46 displays the vehicle speed and the rotation speed of the engine 5. Further, the display 46 may display information regarding a rider and a loaded object (hereinafter referred to as additional object information), or information for assisting and supporting the driving (hereinafter referred to as auxiliary information) may be displayed. Further, the display 46 may be configured such that various information can be entered by a driver. In this case, the display 46 is constituted by a touch panel, for example.

(2) Control System

Figure 3:
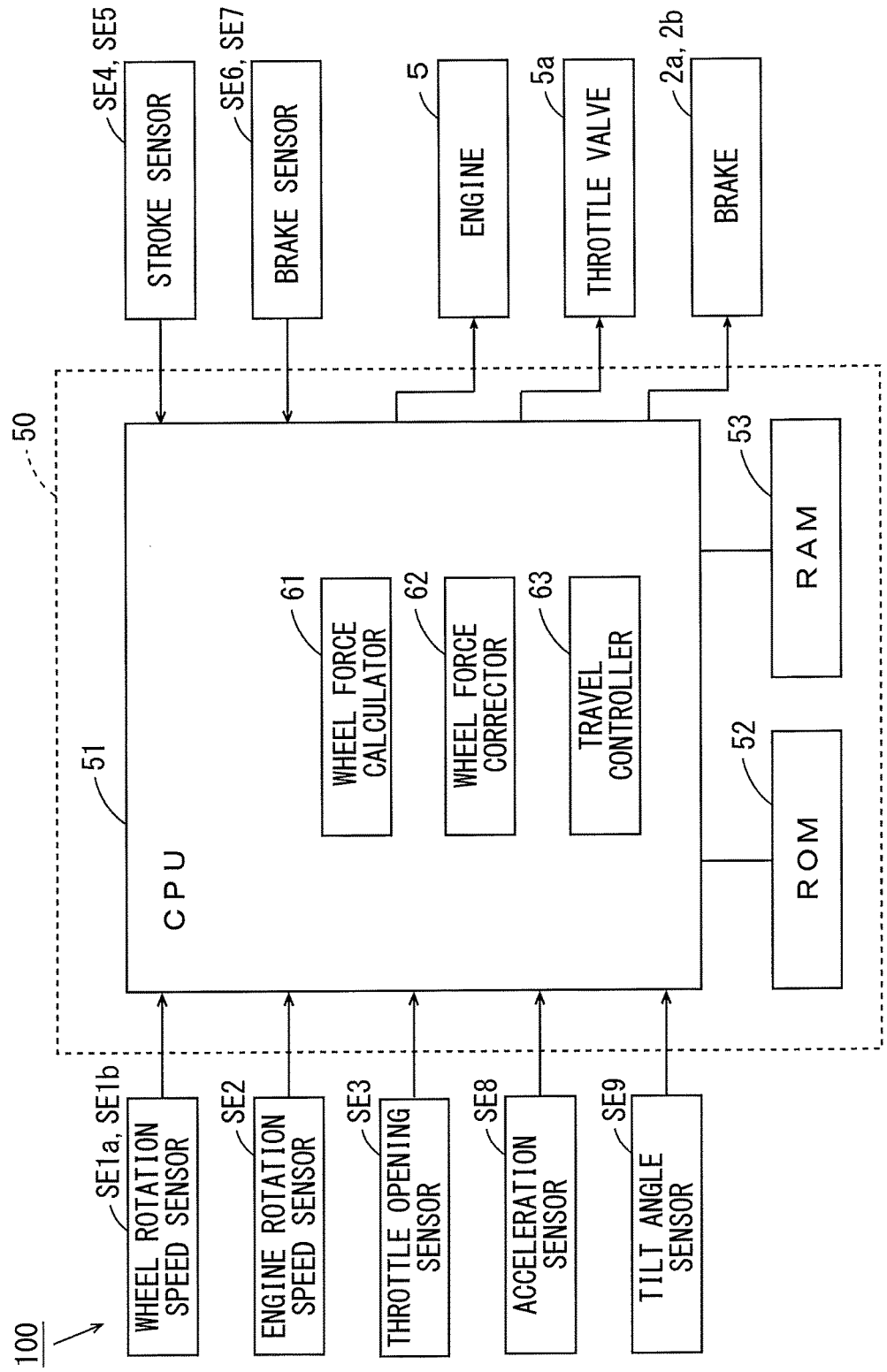
FIG. 3 is a block diagram showing the configuration of a control system of the motorcycle.

FIG. 3 is a block diagram showing the configuration of the control system of the motorcycle 100. As shown in FIG. 3, the ECU 50 includes a CPU (Central Processing Unit) 51, a ROM (Read Only Memory) 52 and a RAM (Random Access Memory) 53. The ROM 52 stores control program of the CPU 51 and the like. Further, the ROM 52 stores various fixed values of the motorcycle 100 as vehicle information. The RAM 53 stores various data and functions as a processing area of the CPU 51. The CPU 51 performs a wheel force adjustment process, described below, by executing the control program stored in the ROM 52. In this case, the CPU 51 realizes the function of each of a wheel force calculator 61, a wheel force corrector 62 and a travel controller 63. The CPU 51 is an example of a wheel force acquisition device.

The result of the detection of each of the wheel rotation speed sensors SE1a, SE1b, the engine rotation speed sensor SE2, the throttle opening sensor SE3, the stroke sensors SE4, SE5, the brake sensors SE6, SE7, the accelerator sensor SE8 and the tilt angle sensor SE9 is supplied to the CPU 51. The CPU 51 calculates wheel force (tire force) exerted between the front wheel 2 and the road surface, and between the rear wheel 3 and the road surface based on the result of the detection of each of these. Further, the CPU 51 controls the engine 5, the throttle valve 5a and the brakes 2a, 3a based on the calculated wheel force. Thus, the travel of the motorcycle 100 is controlled.

(3) Wheel Force

The motorcycle 100 travels with an additional object including at least the rider being loaded. The rider includes at least the driver, and may further include a passenger. Further, the additional object may include the loaded object in addition to the rider. Hereinafter, an entirety of the motorcycle 100 and the additional object is referred to as a movable body 100A.

The wheel force includes longitudinal force, transverse force and up-and-down force. The longitudinal force is exerted in a direction parallel to the moving direction of the motorcycle 100 and parallel to the road surface. The transverse force is exerted in a direction perpendicular to the moving direction of the motorcycle 100 and parallel to the road surface. The up-and-down force is exerted in a direction perpendicular to the road surface.

Figure 4:
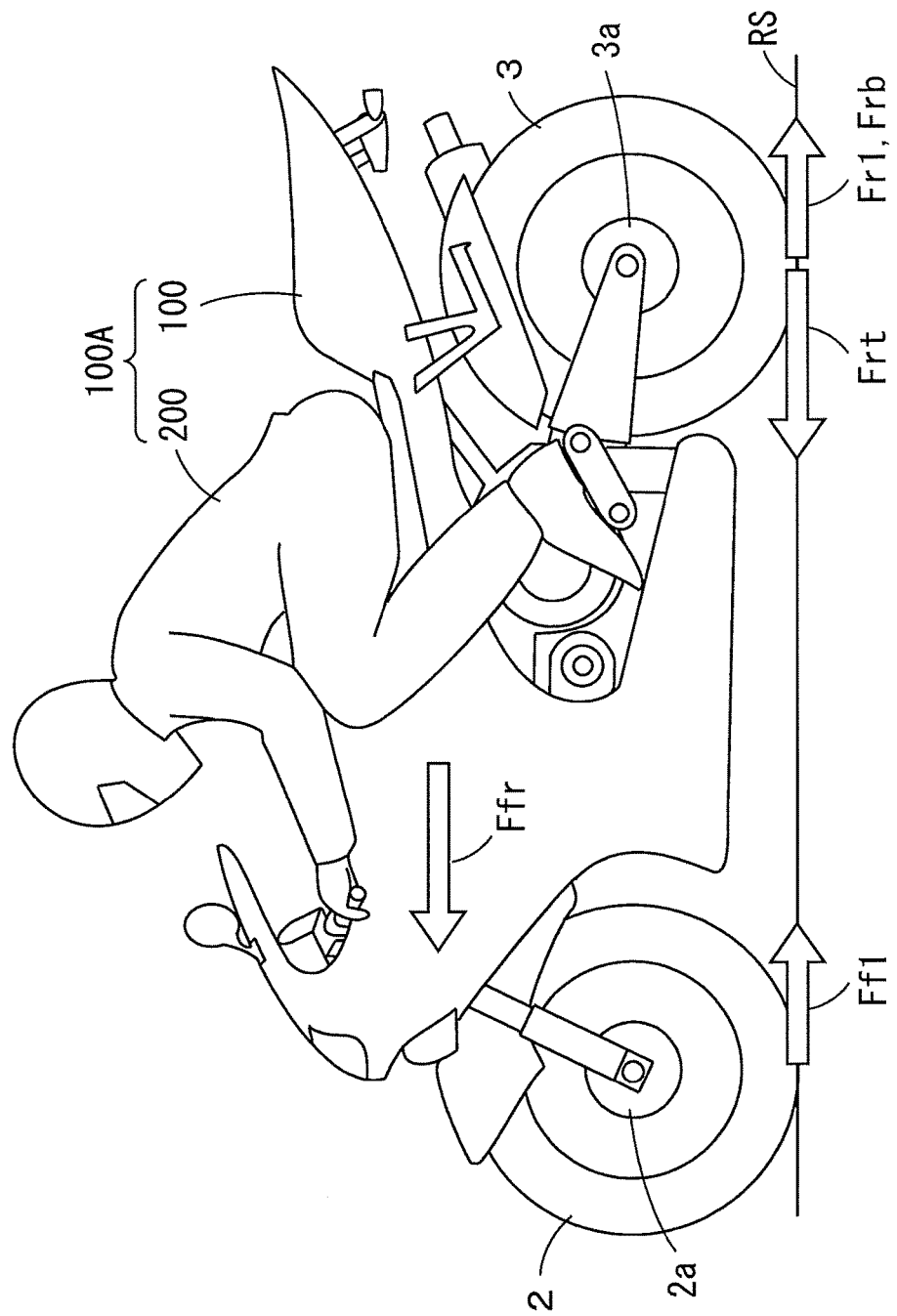
FIG. 4 is a diagram for explaining longitudinal force of each of a front wheel and a rear wheel.
Figure 5:
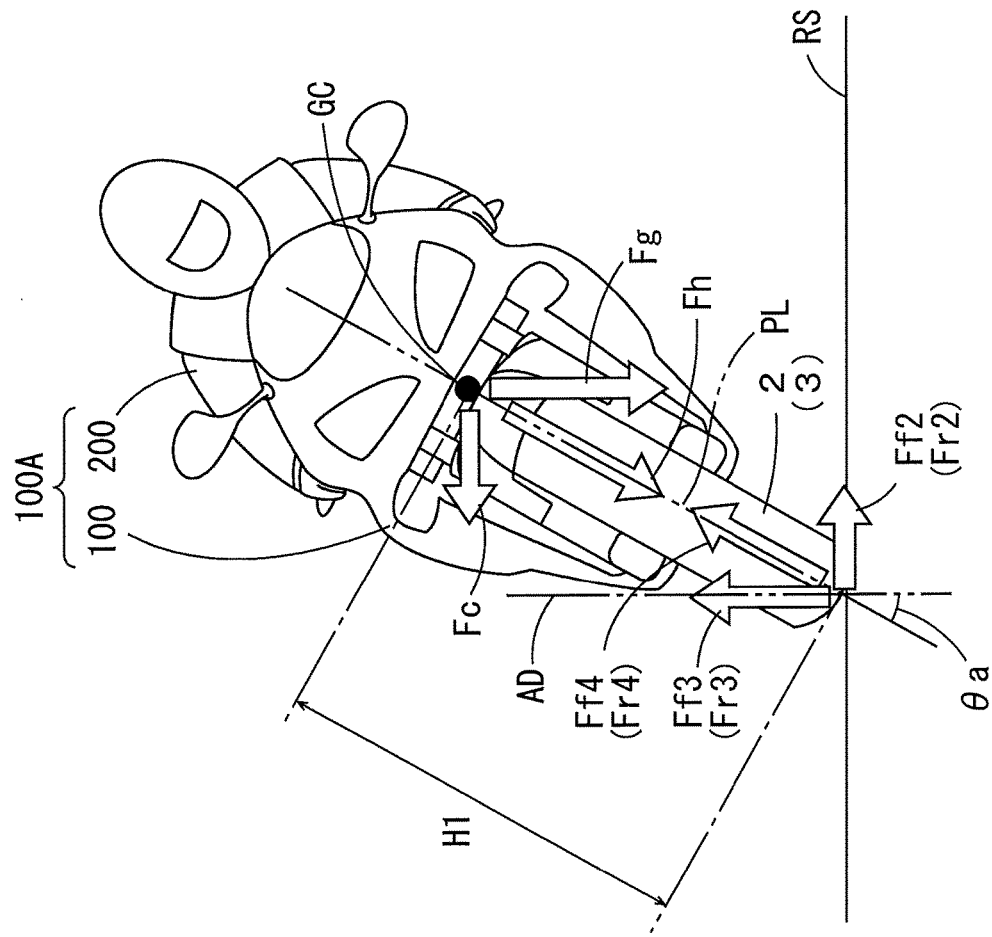
FIG. 5 is a diagram for explaining transverse force of each of the front wheel and the rear wheel.
Figure 6:
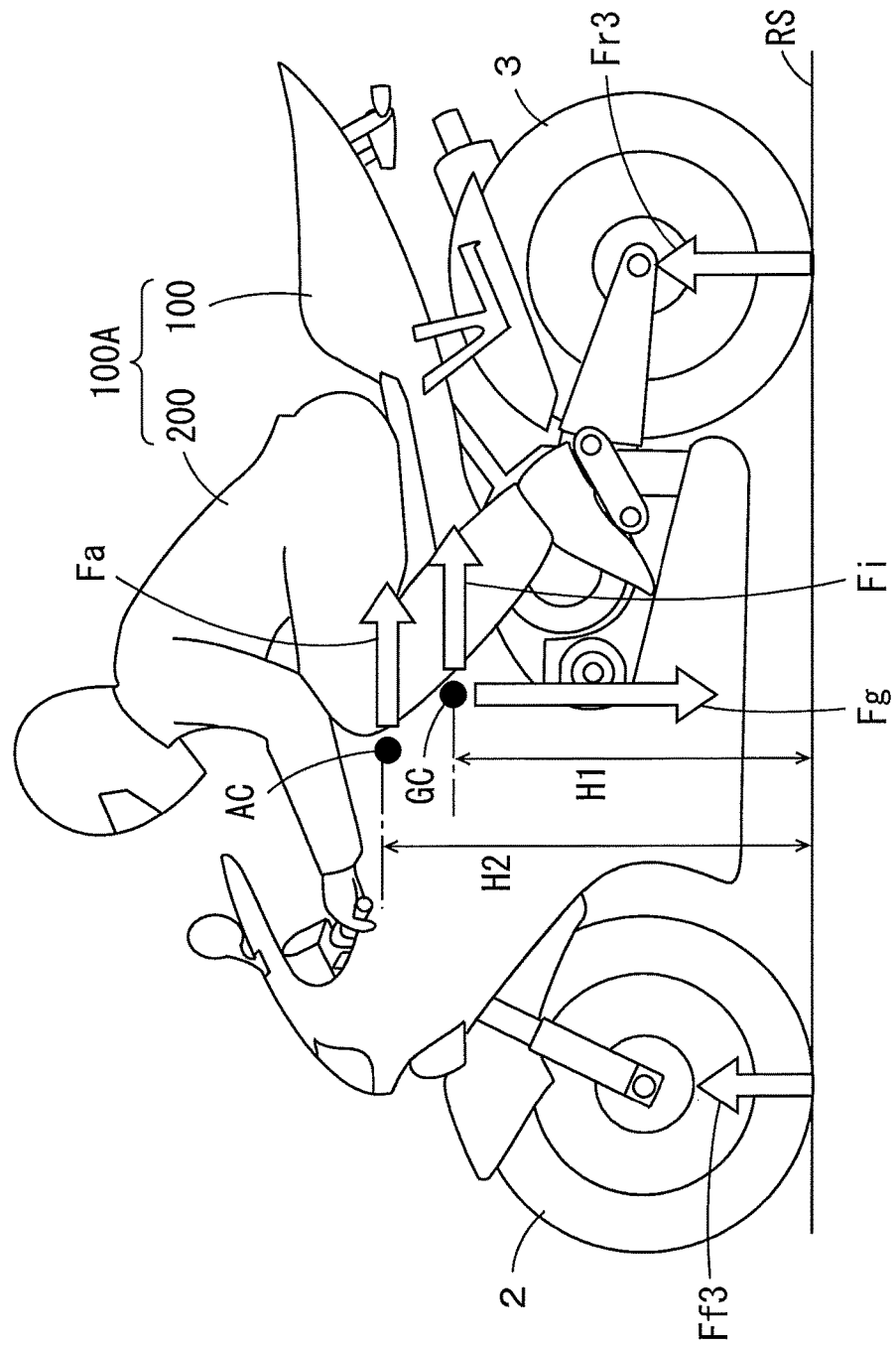
FIG. 6 is a diagram for explaining up-and-down force of each of the front wheel and the rear wheel.

The wheel force of the travelling motorcycle 100 will be described below with reference to FIGS. 4 to 6. In the examples of FIGS. 4 to 6, the additional object is the driver 200. Further, in the following description, the condition of the additional object includes mass, posture and the number of the rider, mass of the loaded object and the like.

(3-1) Longitudinal Force

FIG. 4 is a diagram for explaining the longitudinal force of the front wheel 2 and the rear wheel 3. The driving force is generated by the engine 5 (FIG. 1), and when the driving force is transmitted to the rear wheel 3, driving force Frt in a forward direction is exerted on the rear wheel 3 as shown in FIG. 4.

The driving force Frt can be calculated based on the rotation speed of the engine 5 (FIG. 1) detected by the engine rotation speed sensor SE2 (FIG. 1), the throttle opening detected by the throttle opening sensor SE3 (FIG. 1) and the rotation speed of the rear wheel 3 detected by the wheel rotation speed sensor SE1b.

On the other hand, when the front wheel 2 is braked by the brake 2a, braking force Ff1 in a rearward direction is exerted on the front wheel 2, and when the rear wheel 3 is braked by the brake 3a, braking force Fr1 in the rearward direction is exerted on the rear wheel 3. Further, when the accelerator grip 42 (FIG. 2) is operated such that the throttle opening is decreased, braking force Frb in the rearward direction is exerted on the rear wheel 3 as an engine brake.

The brake force Ff1 is detected by the brake sensor SE6 (FIG. 3). The braking force Fr1 is detected by the brake sensor SE7 (FIG. 3). The braking force Frb can be calculated based on the rotation speed of the engine 5 detected by the engine rotation speed sensor SE2 (FIG. 3), the throttle opening detected by the throttle opening sensor SE3 (FIG. 3), and the rotation speed of the rear wheel 3 detected by the wheel rotation speed sensor SE1b.

The braking force Ff1 is equivalent to the longitudinal force of the front wheel 2. Further, resultant force of the driving force Frt and the braking force Fr1, Frb is equivalent to the longitudinal force of the rear wheel 3. Resultant force of the longitudinal force of the front wheel 2 and the rear wheel 3 is equivalent to force Ffr exerted on the movable body 100A in the front-to-rear direction.

(3-2) Transverse Force and Up-And-Down Force

FIG. 5 is a diagram for explaining the transverse force and the up-and-down force of each of the front wheel 2 and the rear wheel 3. FIG. 6 is a diagram for explaining a load movement.

As shown in FIG. 5, at the time of the turning of the motorcycle 100, the motorcycle 100 tilts in a leftward direction or in a rightward direction with respect to the vertical direction. In this case, centrifugal force Fc in an outward direction (a direction away from the center of turn) is exerted on the movable body 100A. Further, gravity Fg is exerted on the movable body 100A. It can be considered that the gravity Fg and the centrifugal force Fc are typically exerted on a center of gravity GC of the movable body 100A.

Resultant force Fh of the centrifugal force Fc and the gravity Fg is exerted in a direction perpendicular to the front-to-rear direction (hereinafter referred to as an axis direction) on a plane PL including a ground contact point of each of the front wheel 2 and the rear wheel 3, and the center of gravity GC of the movable body 100A. Hereinafter, an angle formed by the plane PL with respect to a direction AD perpendicular to the road surface RS is referred to as a bank angle θa of the movable body 100A. The larger the bank angle θa is, the larger the resultant force Fh is. Transverse force Ff2 and up-and-down force Ff3 are exerted on the front wheel 2 from the road surface RS, and transverse force Fr2 and up-and-down force Fr3 are exerted on the rear wheel 3 from the road surface RS, to balance with the resultant force Fh. Each of the transverse force Ff2, Fr2 is exerted on each of the front wheel 2 and the rear wheel 3 in an inward direction (a direction nearer to the center of turn) from the road surface RS, and each of the up-and-down force Ff3, Fr3 is exerted on each of the front wheel 2 and the rear wheel 3 in a perpendicular direction from the road surface RS.

Resultant force Ff4 of the transverse force Ff2 and the up-and-down force Ff3, and resultant force Fr4 of the transverse force Fr2 and the up-and-down force Fr3 are exerted in the axis direction, respectively. Hereinafter, the resultant force Ff4, Fr4 are referred to as axis direction force Ff4, Fr4, respectively. The sum of the axis direction force Ff4, Fr4 is equal to the resultant force Fh. A relation between the axis direction force Ff4 and the transverse force Ff2 is expressed in the following formula (1a), and a relation between the axis direction force Ff4 and the up-and-down force Ff3 is expressed in the following formula (1b). A relation between the axis direction force Fr4 and the transverse force Fr2 is expressed in the following formula (2a), and a relation between the axis direction force Fr4 and the up-and-down force Fr3 is expressed in the following formula (2b).

$$Ff2 = Ff4 \sin \theta a \quad (1a)$$

$$Ff3 = Ff4 \cos \theta a \quad (1b)$$

$$Fr2 = Fr4 \sin \theta a \quad (2a)$$

$$Fr3 = Fr4 \cos \theta a \quad (2b)$$

Each of the transverse force Ff2, Fr2 differs depending on the bank angle θa of the movable body 100A, and each of the up-and-down force Ff3, Fr3 differs depending on the gravity Fg. When the road surface RS is horizontal, the total of the up-and-down force Ff3, Fr3 is equal to the gravity Fg. The mass of the motorcycle 100 is substantially constant, and is stored in advance as the vehicle information. On the other hand, the mass of the additional object is not constant. Therefore, the gravity Fg differs depending on the mass of the additional object, so that the total of the up-and-down force Ff3, Fr3 differs.

A ratio of the axis direction force Ff4 to fr4 differs depending on the position of the center of gravity GC of the movable body 100A in the front-to-rear direction (hereinafter referred to as a front-to-rear position), for example. Further, the ratio of the axis direction force Ff4 to Fr4 differs depending on the load movement generated by inertial force and air resistance.

As shown in FIG. 6, inertial force Fi in the rearward direction is generated at the movable body 100A at the time of the acceleration of the motorcycle 100, and the inertial force Fi in the forward direction is generated at the movable body 100A at the time of the deceleration of the motorcycle 100. Conveniently, the inertial force Fi in the rearward direction is expressed in a positive value, and the inertial force Fi in the forward direction is expressed in a negative value. It can be considered that the inertial force Fi is typically exerted on the center of gravity GC of the movable body 100A. The inertial force Fi is expressed in the following formula (3).

$$Fi = ma \quad (3)$$

In the formula (3), 'm' is the mass of the movable body 100A, and 'a' is the acceleration of the motorcycle 100. Therefore, the mass of the movable body 100A differs depending on the mass of the additional object, so that the inertial force Fi differs.

Further, the air resistance Fa in the rearward direction is exerted on the travelling movable body 100A. It can be considered that the air resistance Fa is typically exerted on the center of aerodynamic force AC of the movable body 100A. The air resistance Fa is expressed in the following formula (4).

[Formula 1]

$$Fa = \frac{1}{2} \rho C d A v^2 \quad (4)$$

In the formula (4), 'ρ' is air density, 'Cd' is a drag coefficient of the movable body 100A, 'A' is a frontal projected area of the movable body 100A, and 'v' is the vehicle speed. The vehicle speed v is acquired from the result of the detection of the wheel rotation speed sensor SE1a. A multiplication value CdA of the drag coefficient and the frontal projected area (hereinafter referred to as a drag calculation value CdA) differs depending on the condition of the additional object. For example, the larger a tilt angle of the upper half of the body of the driver 200 is, the smaller the drag calculation value CdA is. Therefore, the air resistance Fa differs depending on the condition of the additional object.

The load movement is generated between the front wheel 2 and the rear wheel 3 by the inertial force Fi and the air resistance Fa. An amount of load movement W1 generated by the inertial force Fi is expressed in the following formula (5). An amount of load movement W2 generated by the air resistance Fa is expressed in the following formula (6).

$$W1 = Fi \times (H1/L) \quad (5)$$

$$W2 = Fa \times (H2/L) \quad (6)$$

The amounts of load movement W1, W2 respectively indicate the movement amounts of the load from the front wheel 2 to the rear wheel 3. The amount of load movement W1 is a positive value at the time of the acceleration, and is a negative value at the time of the deceleration. The amount of load movement W2 is a positive value at the time of the acceleration and deceleration both. In the formulas (5) and (6), 'H1' is a height of the center of gravity GC of the movable body 100A, 'H2' is a height of the center of aerodynamic force AC of the movable body 100A, and 'L' is a wheelbase of the motorcycle 100 (a distance between the rotational center of the front wheel 2 and the rotational center of the rear wheel 3). The height H1 of the center of gravity GC and the height H2 of the center of aerodynamic force AC are the distance from the road surface RS to the center of gravity GC in the axis direction, and the distance from the road surface RS to the center of aerodynamic force AC, respectively. The wheelbase L is a fixed value of the motorcycle 100, and is stored in advance as the vehicle information.

The total of the amounts of load movement W1, W2 is the amount of change of the axis direction force Ff4, Fr4. Specifically, in a case in which the axis direction force of the front wheel 2 and the rear wheel 3, that are respectively acquired when the inertial force Fi and the air resistance Fa are 0, and the bank angle θa of the movable body 100A is 0°, are respectively expressed by Ff4s, Fr4s, the actual axis direction force Ff4, Fr4 are respectively expressed in the following formulas (7) and (8).

$$Ff4 = (Ff4s/\cos\theta a) - (W1 + W2) \quad (7)$$

$$Fr4 = (Fr4s/\cos\theta a) + (W1 + W2) \quad (8)$$

Each of the height H1 of the center of gravity GC of the formula (5), the height H2 of the center of aerodynamic force AC of the formula (6) and the bank angle θa differs depending on the condition of the additional object. Further, each of the axis direction force Ff4s, Fr4s of each of the formulas (7) and (8) differs depending on the mass of the additional object and the position of the center of gravity GC.

As described below, in the present embodiment, each of the front-to-rear position and the height H1 of the center of gravity GC, the bank angle θa, the mass, the drag calculation value CdA and the height H2 of the center of aerodynamic force AC, of the movable body 100A is estimated based on the condition of the additional object. Each of the transverse force Ff2, Fr2 and the up-and-down force Ff3, Fr3 is found based on its estimated value.

(4) Estimation Based on Condition of Additional Object

As for four-wheeled automobiles, the vehicle is sufficiently large as compared to the additional object such as the rider and the loaded object, and the additional object is basically stored in the vehicle. Further, stability of the vehicle itself is high, and the vehicle hardly tilts with respect to the road surface. Therefore, the change in the wheel force due to the condition of the additional object is small, and it is hardly necessary to consider the condition of the additional object in calculating the wheel force.

On the other hand, as for the saddle-straddling type motor vehicle such as the motorcycle 100, a difference between the size of the additional object and the size of the vehicle is small, and the additional object is basically exposed. Further, the vehicle tilts with respect to the road surface at the time of turning. Thus, a large change in the wheel force is generated depending on the condition of the additional object. Therefore, it is necessary to consider the condition of the additional object in order to accurately calculate the wheel force.

Therefore, in the present embodiment, various parameters that are necessary for the calculation of the transverse force Ff2, Fr2 and the up-and-down force Ff3, Fr3 are estimated based on the condition of the additional object. In this case, the transverse force Ff2, Fr2 and the up-and-down force Ff3, Fr3 that are calculated are corrected based on the condition of the additional object. As a result, the transverse force Ff2, Fr2 and the up-and-down force Ff3, Fr3 that are corresponding to the condition of the additional object are acquired.

(4-1-1) Estimation of Mass

As described above, the force Ffr (FIG. 4) exerted on the movable body 100A in the front-to-rear direction can be calculated from the longitudinal force of each of the front wheel 2 and the rear wheel 3. The force Ffr is expressed in the following formula (9) as an equation of motion.

$$Ffr = ma \quad (9)$$

In the formula (9), 'm' is the mass of the movable body 100A, and 'a' is the acceleration of the motorcycle 100. Therefore, the calculated force Ffr is divided by the accelerator 'a' detected by the accelerator sensor SE8, whereby the mass 'm' of the movable body 100A is found. Further, the mass of the motorcycle 100 stored as the vehicle information is subtracted from the found mass 'm' of the movable body 100A, whereby the mass of the additional object is estimated.

(4-1-2) Estimation of Center of Gravity Position

Figure 7A:
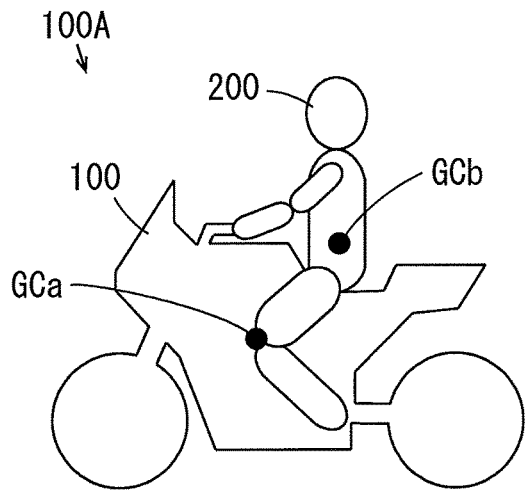
FIGS. 7A to 7C are diagrams for explaining a relation between mass of an additional object and a position of a center of gravity.
Figure 7B:
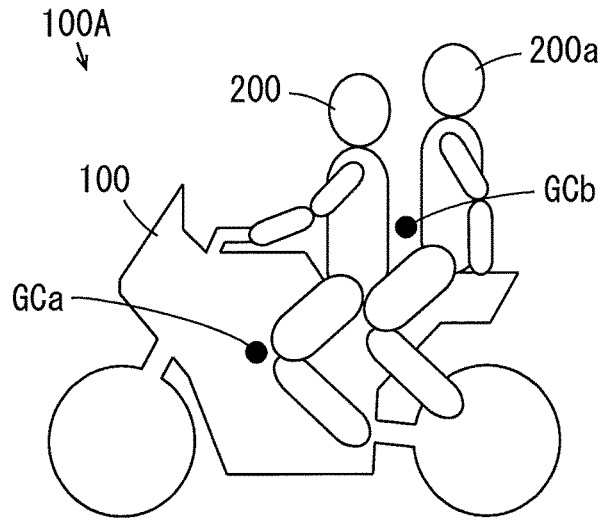
Figure 7C:
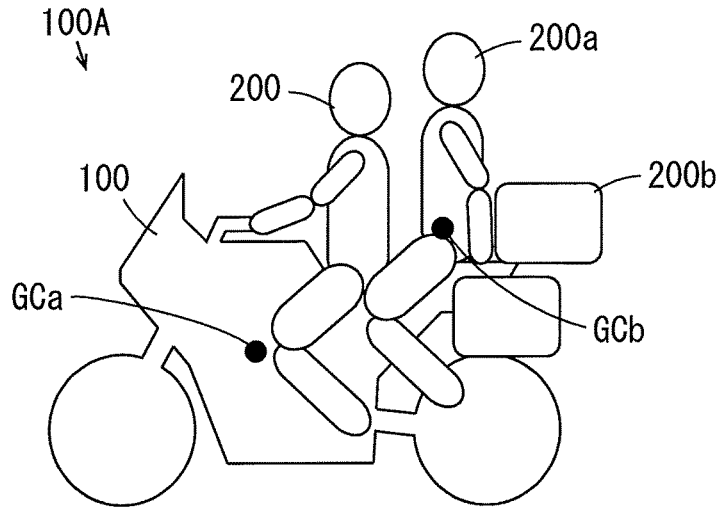

FIGS. 7A to 7C are diagrams for explaining a relation between the mass of the additional object and the center of gravity position. In FIGS. 7A to 7C, each of black dots GCa indicates the center of gravity of the motorcycle 100, and each of black dots GCb indicates a center of gravity of the additional object. A position of the center of gravity GCa of the motorcycle 100 does not differ depending on the condition of the additional object but is constant. On the other hand, the center of gravity GCb of the additional object differs depending on the condition of the additional object.

In the example of FIG. 7A, the additional object is only the driver 200. In the example of FIG. 7B, the additional object includes the passenger 200a in addition to the driver 200. The passenger 200a is seated behind the driver 200, and a center of gravity of the passenger 200a is higher than a center of gravity of the driver 200. In this case, the center of gravity GCb of the additional object shifts in the rearward direction and is high as compared to the example of FIG. 7A. In the example of FIG. 7C, the additional object includes the loaded object 200b in addition to the driver 200 and the passenger 200a. The loaded object 200b is loaded behind the passenger 200a. A center of gravity of the loaded object 200b is lower than the center of gravity of the passenger 200a. In this case, the center of gravity GCb of the additional object shifts in the rearward direction and is low as compared to the example of the FIG. 7B.

In this manner, there is a correlation between the mass of the additional object and the position of the center of gravity GCb. Therefore, each of the front-to-rear position of the center of gravity GCb and the height of the center of gravity GCb is estimated based on the mass of the additional object. For example, information of the center of gravity position showing the relation between the mass of the additional object and the position of the center of gravity GCb is stored in advance in the ROM 52 of FIG. 3. The position of the center of gravity GCb of the additional object is estimated based on the mass of the additional object calculated from the information of the center of gravity position and the above formula (9).

Figure 8A:
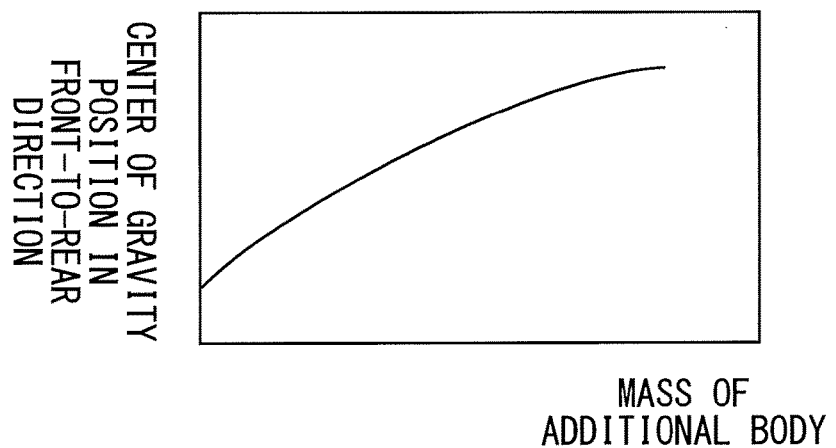
FIGS. 8A and 8B are diagrams showing an example of information of the mass and the center of gravity.
Figure 8B:
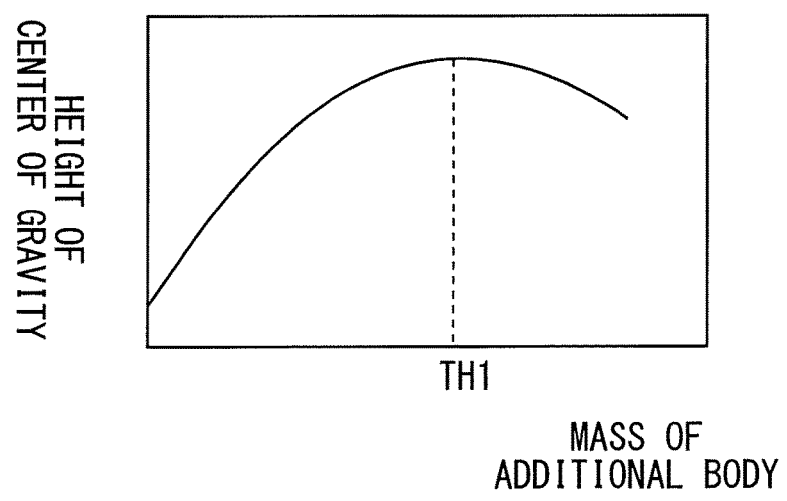

FIGS. 8A and 8B are diagrams showing the examples of the information of the center of gravity position. In FIG. 8A, the abscissa indicates the mass of the additional object, and the ordinate indicates the front-to-rear position of the center of gravity GCb. The front-to-rear position is expressed as the distance between the front end of the movable body 100A and the center of gravity GCb in the front-to-rear direction, for example. In FIG. 8B, the abscissa indicates the mass of the additional object, and the ordinate indicates the height of the center of gravity GCb. In the present example, it is assumed that the loaded object 200b is loaded only when the passenger 200a is riding, and the loaded object 200b is not loaded when the passenger 200a is not riding.

In this case, the passenger 200a and the loaded object 200b are sequentially added to the additional object, so that the mass of the additional object gradually increases, and the center of gravity GCb gradually shifts in the rearward direction. Therefore, in the example of FIG. 8A, an amount of shift of the center of gravity GCb in the rearward direction increases as the mass of the additional object increases. Further, when the passenger 200a is added to the additional object, the center of gravity Gb is raised. On the other hand, when the loaded object 200b is further added to the additional object, the center of gravity Gb is lowered as compared to the case in which only the passenger 200a is added. Therefore, in the example of FIG. 8B, when the mass of the additional object is not more than a threshold value TH1, the center of gravity GCb is raised as the mass of the additional object increases. When the mass of the additional object is larger than the threshold value TH1, the center of gravity GCb is lowered as the mass of the additional object increases. The threshold value TH1 is equivalent to the standard mass acquired when the additional object is the driver 200 and the passenger 200a.

In this manner, the front-to-rear position and the height of the center of gravity GCb of the additional object are estimated. On the other hand, the mass and the position of the center of gravity GCa of the motorcycle 100 are stored in advance as the vehicle information. In this case, the position of the center of gravity GCa is determined relative to a constant standard position (the rotational center of the front wheel 2 or the rear wheel 3, for example). The position of the center of gravity GC of the movable body 100A is estimated based on the mass and the position of the center of gravity GCb of the additional object that are estimated, and the mass and the position of the center of gravity GCa of the motorcycle 100 that are stored as the vehicle information.

Figure 9A:
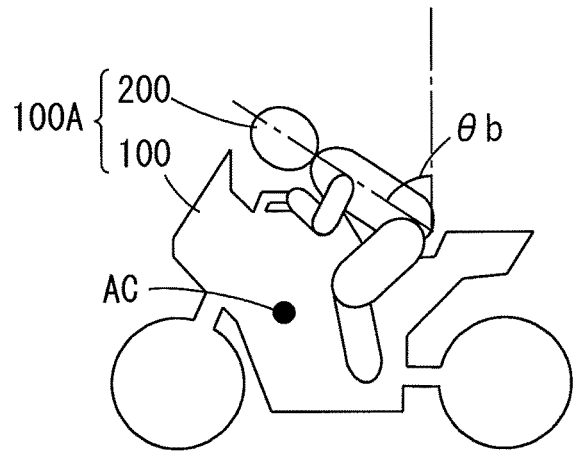
FIGS. 9A to 9C are diagrams for explaining an upper body angle of a driver.
Figure 9B:
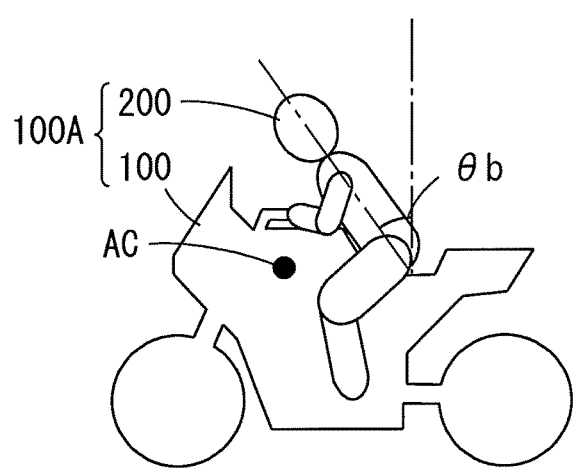
Figure 9C:
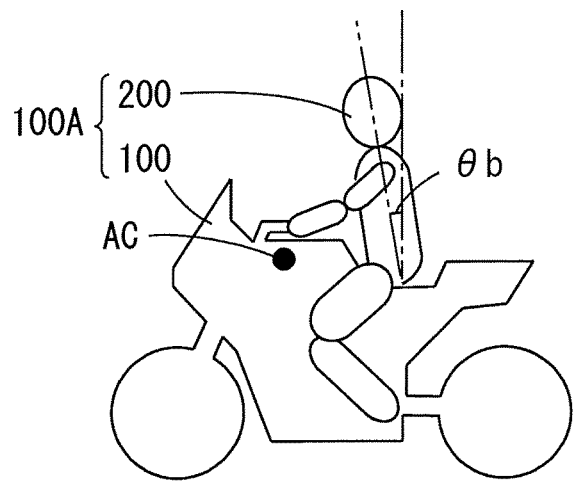

(4-1-3) Estimation of Drag Calculation Value and Height of Center of Aerodynamic Force The tilt angle of the upper half of the body of the driver 200 changes depending on the travel condition of the movable body 100A. Hereinafter, the tile angle of the upper half of the body of the driver 200 with respect to the direction perpendicular to the road surface is referred to as an upper body angle. FIGS. 9A to 9C are diagrams for explaining the upper body angle of the driver 200.

The upper body angle θb of the driver 200 in the example of FIG. 9A is larger than the upper body angle θb of the driver 200 in the example of FIG. 9B, and the upper body angle θb of the driver 200 in the example of FIG. 9B is larger than the upper body angle θb of the driver 200 in the example of FIG. 9C. There is a correlation between the upper body angle θb of the driver 200 and the speed of the movable body 100A. The higher the speed of the movable body 100A is, the larger the upper body angle θb of the driver 200 is likely to be, as shown in the example of FIG. 9A. On the other hand, the lower the speed of the movable body 100A is, the smaller the upper body angle θb of the driver 200 is likely to be, as shown in the example of FIG. 9C.

Each of the drag calculation value CdA and the height H2 of the center of aerodynamic force AC differs depending on the upper body angle θb of the driver 200. Specifically, the larger the upper body angle θb is, the smaller the drag calculation value CdA of the above formula (4) is and the lower the center of aerodynamic force AC is. Therefore, the higher the vehicle speed is, the smaller the drag calculation value CdA is likely to be and the lower the center of aerodynamic force AC is likely to be.

Therefore, each of the drag calculation value CdA and the height H2 of the center of aerodynamic force AC is estimated based on the result of the detection of the wheel rotation speed sensor SE1a. In this case, standard values of the drag calculation value CdA and the height H2 of the center of aerodynamic force AC are determined in advance, respectively. For example, the drag calculation value CdA and the height H2 of the center of aerodynamic force AC of the movable body 100A acquired when the upper body angle θb of the driver 200 is a constant value are set to the standard values, respectively. The set standard values are stored in the ROM 52 of FIG. 3, for example.

The standard value of the drag calculation value CdA is multiplied by a correction coefficient T1 corresponding to the result of the detection of the wheel rotation speed sensor SE1a. Further, the standard value of the height H2 of the center of aerodynamic force AC is multiplied by a correction coefficient T2 corresponding to the result of the detection of the wheel rotation speed sensor SE1a.

Figure 10A:
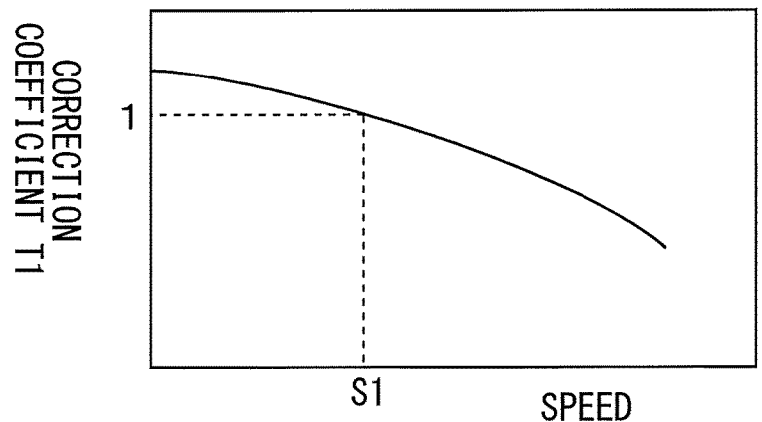
FIGS. 10A and 10B are diagrams showing a relation between a vehicle speed and a correction coefficient.
Figure 10B:
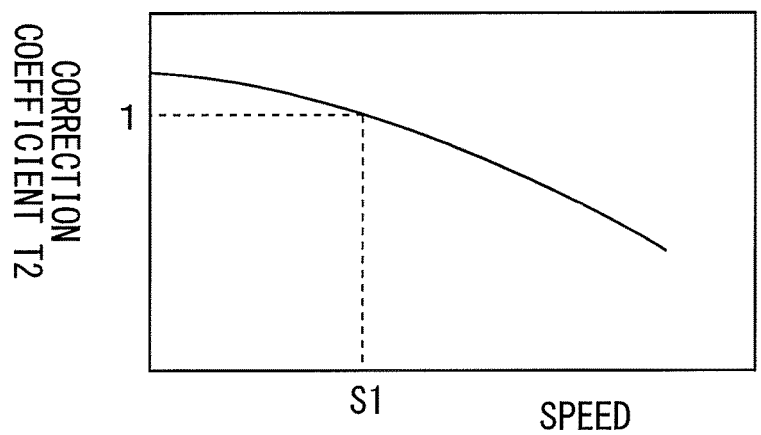

FIGS. 10A and 10B are diagrams showing a relation between the vehicle speed and the correction coefficient T1, and a relation between the vehicle speed and the correlation coefficient T2. In FIGS. 10A and 10B, the abscissa indicates the vehicle speed, and the ordinate indicates the correction coefficient T1 or the correction coefficient T2.

As shown in FIG. 10A, the correction coefficient T1 is set such that the higher the vehicle speed is, the smaller the correction coefficient T1 is. Similarly, as shown in FIG. 10B, the correction coefficient T2 is set such that the higher the vehicle speed is, the smaller the correction coefficient T2 is. In the examples of FIGS. 10A and 10B, when the vehicle speed is S1, the correction coefficients T1, T2 are 1, respectively. This means that when the vehicle speed is S1, the drag calculation value CdA and the height H2 of the center of aerodynamic force AC are the standard values, respectively. The correction coefficients T1, T2 are larger than 1, respectively, when the vehicle speed is lower than the S1, and the correction coefficients T1, T2 are larger than 0 and less than 1, respectively, when the vehicle speed is higher than S1.

For example, the drag calculation value CdA and the height H2 of the center of aerodynamic force AC in the example of FIG. 9B are set to the standard values, respectively. In this case, the correction coefficients T1, T2 are 1, respectively, in the example of FIG. 9B, the correction coefficients T1, T2 are larger than 0 and less than 1, respectively, in the example of FIG. 9A, and the correction coefficients T1, T2 are larger than 1, respectively, in the example of FIG. 9C.

In this manner, the predetermined standard value is multiplied by each of the correction coefficients T1, T2 corresponding to the result of the detection of the wheel rotation speed sensor SE1a, whereby the estimated value of each of the drag calculation value CdA and the height H2 of the center of aerodynamic force AC of the movable body 100A is acquired.

Further, there is a correlation between the upper body angle θb of the driver 200 and the acceleration of the movable body 100A. At the time of the acceleration of the movable body 100A, the upper body angle θb of the driver 200 is likely to be large as in the example of FIG. 9A. On the other hand, at the time of the deceleration of the movable body 100A, the upper body angle θb of the driver 200 is likely to be small as in the example of FIG. 9C. Therefore, the higher the acceleration is, the smaller the drag calculation value CdA is likely to be and the lower the center of aerodynamic force AC is likely to be. Thus, each of the drag calculation value CdA and the height H2 of the center of aerodynamic force AC may be estimated based on the result of the detection of the acceleration sensor SE8 instead of the result of the detection of the wheel rotation speed sensor SE1a.

Also in this case, the standard values of the drag calculation value CdA and the height H2 of the center of aerodynamic force AC are determined in advance, respectively, and the standard values are multiplied by the correction coefficient corresponding to the result of the detection of the acceleration sensor SE8. Thus, the estimated value of each of the drag calculation value CdA and the height H2 of the center of aerodynamic force AC of the movable body 100A is acquired.

Further, each of the drag calculation value CdA and the height H2 of the center of aerodynamic force AC may be estimated based on the result of detection of each of the wheel rotation speed sensor SE1a and the acceleration sensor SE8. Also in this case, the standard values of the drag calculation value CdA and the height H2 of the center of aerodynamic force AC are determined in advance, respectively, and the standard values are multiplied by the correction coefficients corresponding to the results of the detection of the wheel rotation speed sensor SE1a and the acceleration sensor SE8. Thus, the estimated value of each of the drag calculation value CdA and the height H2 of the center of aerodynamic force AC of the movable body 100A is acquired.

When the additional object includes the passenger 200a as in the example of FIG. 7B, the drag calculation value CdA is likely to be large, and the center of aerodynamic force AC is likely to be high. Therefore, further correction for the estimated value of each of the drag calculation value CdA and the height H2 of the center of aerodynamic force AC may be performed based on the mass calculated from the above formula (9). Specifically, the estimated value of each of the drag calculation value CdA and the height H2 of the center of aerodynamic force AC is corrected such that the larger the calculated mass is, the larger the drag calculation value CdA is and the higher the center of aerodynamic force AC is.

(4-1-4) Estimation of Height of Center of Gravity and Bank Angle

Figure 11A:
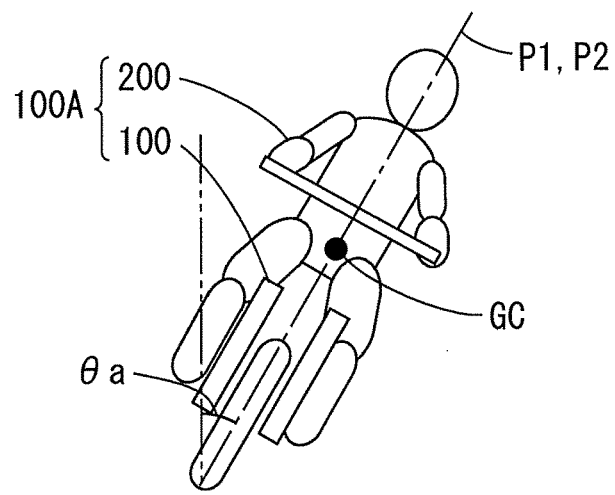
FIGS. 11A to 11C are diagrams for explaining a transverse posture of the driver.
Figure 11B:
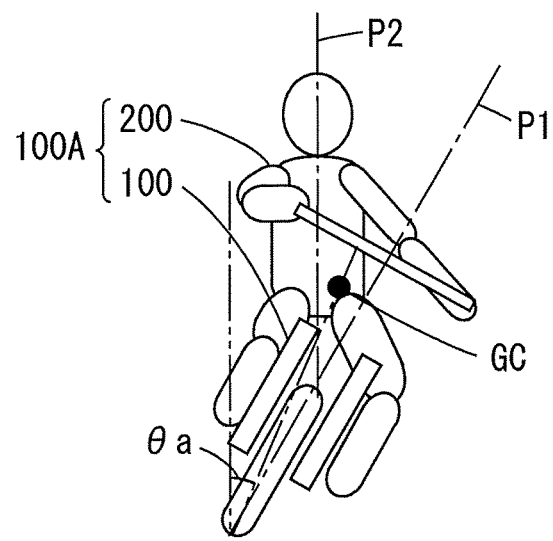
Figure 11C:
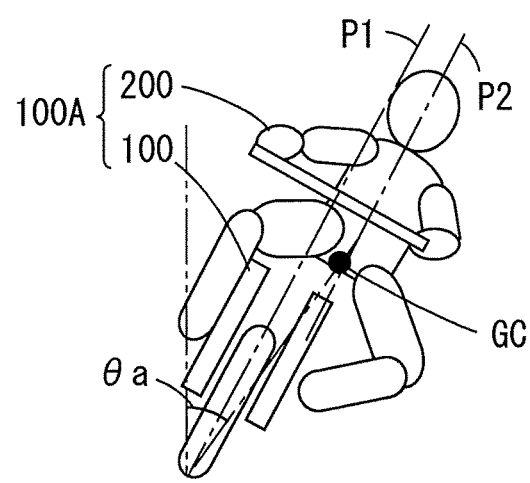

When the movable body 100A tilts in the transverse direction with respect to the vertical direction as in the example of FIG. 5, the posture of the driver 200 in the transverse direction differs depending on the travel condition of the movable body 100A. Hereinafter, the posture of the driver 200 in the transverse direction is referred to as a transverse posture. FIGS. 11A to 11C are diagrams for explaining the transverse posture of the driver 200. In the examples of FIGS. 11A to 11C, the tilt angle of the motorcycle 100 is the same. Here, an axis in the up-and-down direction of the motorcycle 100 is referred to as an up-and-down axis P1, and an axis in the up-and-down direction of the driver 200 is referred to as an up-and-down axis P2.

In the example of FIG. 11A, the transverse posture of the driver 200 is lean-with, and the up-and-down axis P1 of the motorcycle 100 coincides with the up-and-down axis P2 of the driver 200 as viewed from the front. For example, when the movable body 100A travels on a general road that is paved (hereinafter referred to as a general paved road), the transverse posture of the driver 200 is likely to be lean-with as in the example of FIG. 11A.

In the example of FIG. 11B, the transverse posture of the driver 200 is lean-out, and the up-and-down axis P2 of the driver 200 is positioned outside of the up-and-down axis P1 of the motorcycle 100 (a position that is further away from the center of turn than the up-and-down axis P1) as viewed from the front. In this case, the position of the center of gravity GC of the movable body 100A shifts in the outward direction (the direction away from the center of turn) and is raised as compared to the example of FIG. 11A. Therefore, the tilt angle of the movable body 100A decreases as compared to the example of FIG. 11A. For example, when the movable body 100A travels on a poor road such as a mountainous region, the transverse posture of the driver 200 is likely to be lean-out as in the example of FIG. 11B.

In the example of FIG. 11C, the transverse posture of the driver 200 is lean-in, the up-and-down axis P2 of the driver 200 is positioned inside of the up-and-down axis P1 of the motorcycle 100 (a position that is nearer to the center of turn than the up-and-down axis P1) as viewed from the front. In this case, the position of the center of gravity GC of the movable body 100A shifts in the inward direction (a direction nearer to the center of turn) and is lowered as compared to the example of FIG. 11A. For example, when the movable body 100A travels on a racetrack that is paved (hereinafter referred to as a paved road for races), the transverse posture of the driver 200 is likely to be lean-in as in the example of FIG. 11C.

In the present embodiment, each of the height H1 of the center of gravity GC and the bank angle θa is estimated based on the result of the detection of each of the stroke sensors SE4, SE5, the accelerator sensor SE8 and the tilt angle sensor SE9.

First, each of the height H1 of the center of gravity GC and the bank angle θa, acquired when the transverse posture of the driver 200 is assumed to be lean-with (see FIG. 11A) and the road surface is assumed to be horizontal, is calculated as the standard value. In this case, the tilt angle of the motorcycle 100 coincides with the bank angle of the motorcycle 100, and the bank angle of the motorcycle 100 substantially coincides with the bank angle θa of the movable body 100. Therefore, the tilt angle detected by the tilt angle sensor SE9 is considered as the standard value of the bank angle θa of the movable body 100A. Further, the height H1 of the center of gravity GC (see FIG. 8B) of the movable body 100A that is estimated based on the mass of the additional object is set to the standard value.

When the movable body 100A travels on the poor road, the vibration of the front wheel 2 and the rear wheel 3 is large as compared to the case in which the movable body 100A travels on the general paved road and the paved road for races. Therefore, the change in the amount of stroke of the front suspension and the rear suspension increases. Further, when the movable body 100A travels on the paved road for races, the change in the acceleration of the motorcycle 100 increases as compared to the case in which the movable body 100A travels on the general paved road.

Therefore, the calculated standard value of each of the height H1 of the center of gravity GC and the bank angle θa is corrected based on the result of the detection of each of the stroke sensors SE4, SE5 and the acceleration sensor SE8.

For example, when the rate of change in the amount of stroke (an amount of change per unit time) detected by each of the stroke sensors SE4, SE5 is larger than a predetermined threshold value TH2, the road surface is likely to be the poor road. Therefore, it can be estimated that the transverse posture of the driver 200 is lean-out. In this case, a constant correction value A1 is added to the standard value of the height H1 of the center of gravity GC. Further, a constant correction value B1 is subtracted from the standard value of the bank angle θa.

On the other hand, when the rate of change in the amount of stroke detected by each of the stroke sensors SE4, SE5 is not more than the above-mentioned threshold value TH2, and the rate of change in the acceleration detected by the acceleration sensor SE8 is larger than a predetermined threshold value TH3, the road surface is likely to be the paved road for races. Therefore, it can be estimated that the transverse posture of the driver 200 is lean-in. In this case, a constant correction value A2 is subtracted from the standard value of the height H1 of the center of gravity GC. Further, a constant correction value B2 is added to the standard value of the bank angle θa.

Further, when the rate of change in the amount of stroke detected by each of the stroke sensors SE4, SE5 is not more than the above-mentioned threshold value TH2, and the rate of change in the acceleration detected by the acceleration sensor SE8 is not more than the above-mentioned threshold value TH3, the road surface is likely to be the general paved road. Therefore, it can be estimated that the transverse posture of the driver 200 is lean-with. In this case, the correction of the standard value of each of the height H1 of the center of gravity GC and the bank angle θa is not performed.

In this manner, when the motorcycle 100 tilts in the transverse direction, each of the height H1 of the center of gravity GC and the bank angle θa is estimated based on the transverse posture of the driver 200.

Figure 12:
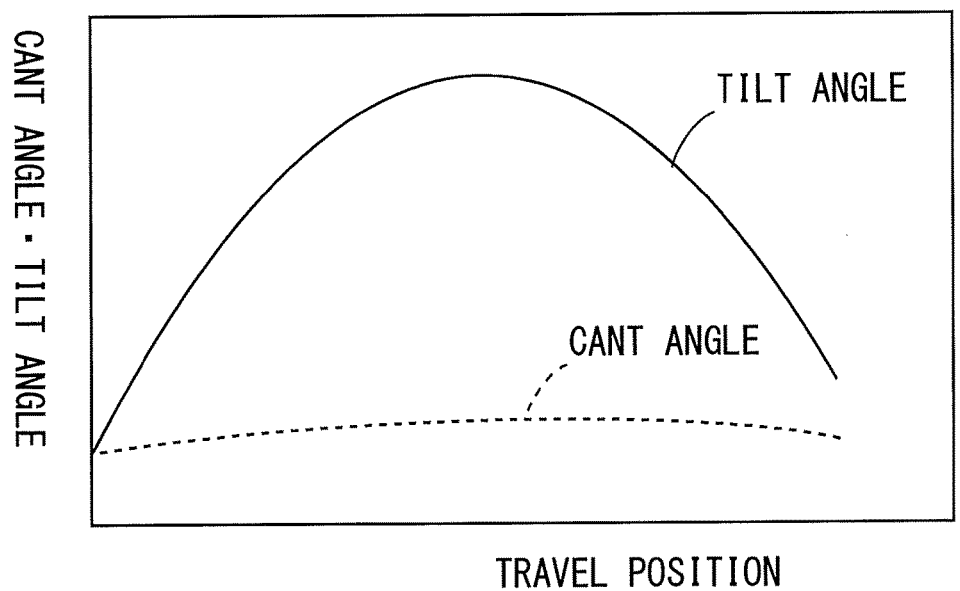
FIG. 12 is a diagram showing a relation between a tilt angle of a movable body and a cant angle of a road surface.

Further, the estimated bank angle θa may be corrected based on the tilt angle of the road surface (hereinafter referred to as the cant angle). When the movable body 100A travels on the general paved road, a constant correlation is generated between the tilt angle of the motorcycle 100 and the tilt angle of the road surface (a cant angle). FIG. 12 is a diagram showing a relation between the tilt angle of the motorcycle 100 and the cant angle of the road surface. In FIG. 12, the abscissa indicates the travel position of the motorcycle 100, and the ordinate indicates the tilt angle of the motorcycle 100 and the cant angle of the road surface.

As shown in FIG. 12, the larger the cant angle of the road surface is, the larger the tilt angle of the motorcycle 100 tends to be.

Therefore, the cant angle of the road surface is estimated based on the tilt angle detected by the tilt angle sensor SE9. For example, cant angle information showing the relation between the tilt angle of the motorcycle 100 and the cant angle of the road surface is stored in advance in the ROM 52 of FIG. 3. During the travel of the motorcycle 100, the cant angle of the road surface is estimated based on the tilt angle detected by the tilt angle sensor SE9 and the stored cant angle information. The bank angle θa is corrected based on the estimated cant angle. Specifically, the bank angle θa is corrected to be decreased by an angle equivalent to the estimated cant angle. Thus, the bank angle θa corresponding to the cant angle of the road surface is acquired.

Further, the cant angle of the road surface may be acquired using a GPS (Global Positioning System). In this case, the cant angle of each of the general roads in various areas is stored in advance as cant angle position information. The cant angle of the road surface on which the motorcycle 100 is travelling can be acquired based on a present position of the motorcycle 100 acquired by the GPS and the stored cant angle position information.

(4-2) Calculation of Transverse Force and Up-And-Down Force

In this manner, the bank angle θa, the front-to-rear position and the height H1 of the center of gravity GC, the mass of the movable body 100A, the drag calculation value CdA and the height H2 of the center of aerodynamic force AC are estimated based on the condition of the additional object.

The inertial force Fi exerted on the movable body 100A is calculated by the above formula (3) using the estimated mass. In this case, the value detected by the acceleration sensor SE8 is used as the acceleration 'a' of the formula (3).

Further, the air resistance Fa (FIG. 6) exerted on the movable body 100A is calculated by the above formula (4) using the estimated drag calculation value CdA. In this case, a predetermined constant value may be used, or a value conveniently calculated by the detection of a temperature, air pressure and the like may be used, as the air density p of the formula (4). Further, the value acquired from the result of the detection of the wheel rotation speed sensor SE1a is used as the vehicle speed v of the formula (4).

Each of the amount of load movement W1, W2 is calculated by each of the above formulas (5) and (6) using the inertial force Fi and the air resistance Fa that are calculated, and the height H1 of the center of gravity GC and the height H2 of the center of aerodynamic force AC that are estimated. In this case, a value stored as the vehicle information is used as the wheelbase L of the formulas (5) and (6).

Each of the axis direction force Ff4, Fr4 is calculated by each of the above formulas (7) and (8) using the calculated amounts of load movement W1, W2 and the estimated bank angle θa. Each of the axis direction force Ff4s, Fr4s of each of the formulas (7) and (8) can be calculated based on the front-to-rear position of the center of gravity GC and the mass of the movable body 100A that are estimated. Each of the transverse force Ff2, Fr2 and the up-and-down force Ff3, Fr3 is found from the calculated axis direction force Ff4s, Fr4s and the estimated bank angle θa.

(5) Travel Control

Figure 13:
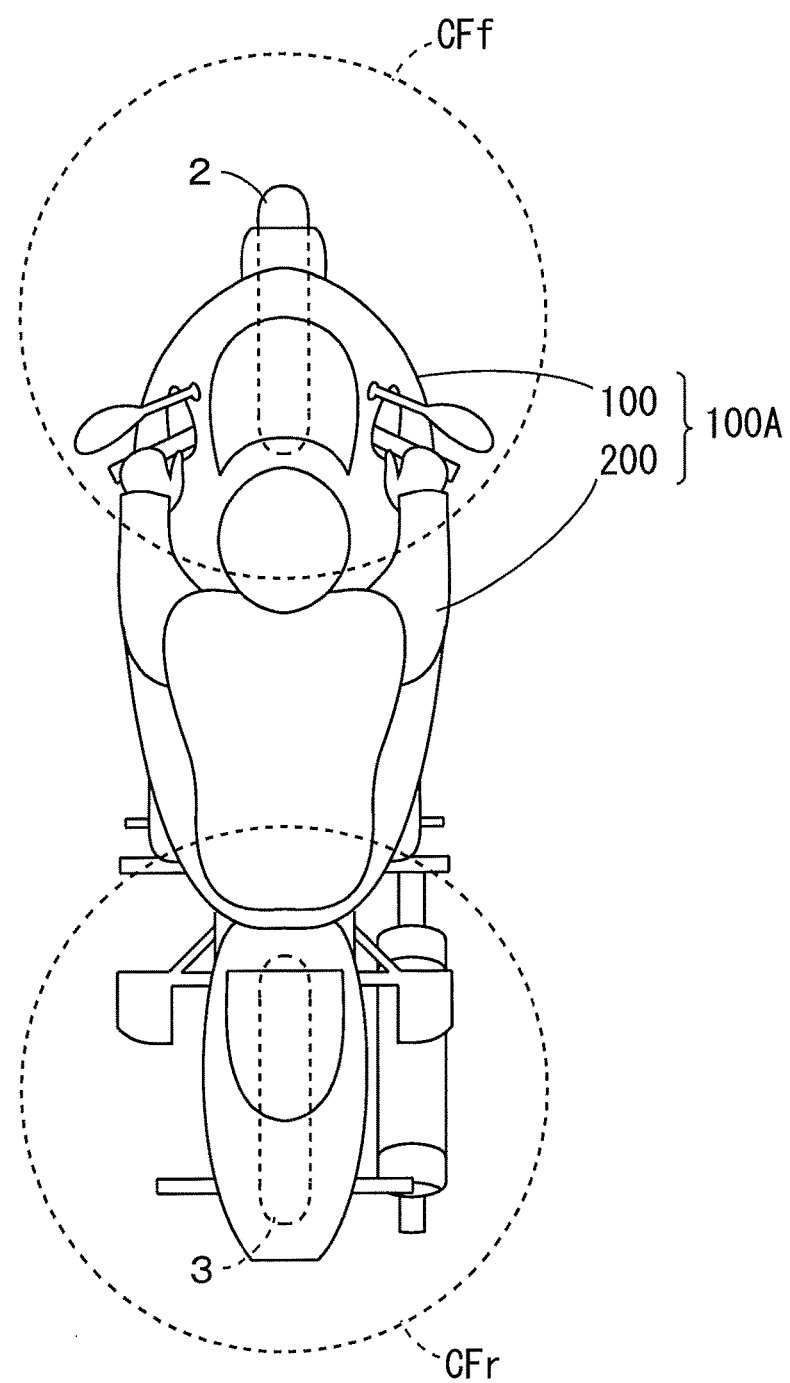
FIG. 13 is a diagram showing a friction circle corresponding to each of the front wheel and the rear wheel of the motorcycle.

The travel control of the motorcycle 100 is performed based on the calculated wheel force. The travel control of the motorcycle 100 using a friction circle will be described as a specific example. FIG. 13 is a diagram showing the friction circle corresponding to each of the front wheel 2 and the rear wheel 3 of the motorcycle 100.

As shown in FIG. 13, a limit value of a grip of the front wheel 2 is shown as a friction circle CFf, and a limit value of a grip of the rear wheel 3 is shown as a friction circle CFr. The shape of the friction circles CFf, CFr is not limited to a perfect circle as in the example of FIG. 13, but may be in another shape such as an ellipse. The size of the friction circle CFf (a diameter in the present example) is set based on the calculated up-and-down force Ff3 of the front wheel 2, and the size of the friction circle CFr is set based on the calculated up-and-down force Fr3 of the rear wheel 3. The set friction circle CFf and the calculated transverse force and longitudinal force of the front wheel 2 are compared. Further, the set friction circle CFr and the calculated transverse force and longitudinal force of the rear wheel 3 are compared.

The sizes of the friction circles CFf, CFr are equivalent to the value in which the up-and-down force Ff3, Fr3 are multiplied by the friction coefficients between the front wheel 2 and the road surface, and between the rear wheel 3 and the road surface, respectively. Therefore, for example, at the time of the slip of the rear wheel 3, each of the driving force and the transverse force exerted on the rear wheel 3 is detected, and the friction coefficient may be estimated based on its result of the detection. In this case, the size of each of the friction circles CFf, CFr can be set using the estimated friction coefficient. Thus, each of the friction circles CFf, CFr can be appropriately set according to the condition of the road surface.

Figure 14A:
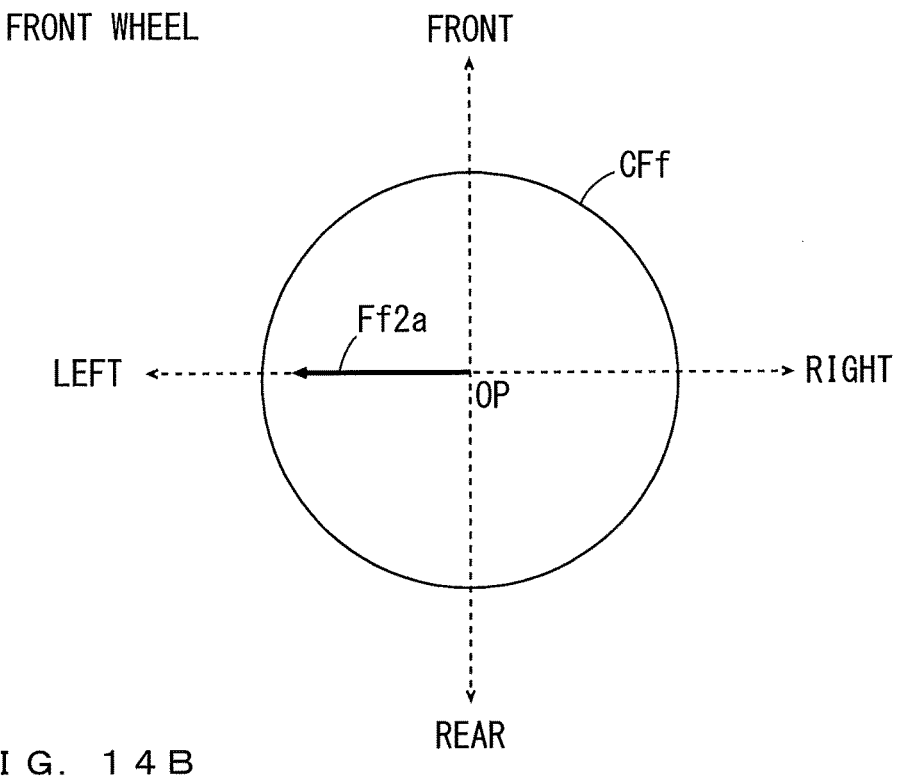
FIGS. 14A and 14B are diagrams for explaining a relation between the friction circle and wheel force.
Figure 14B:
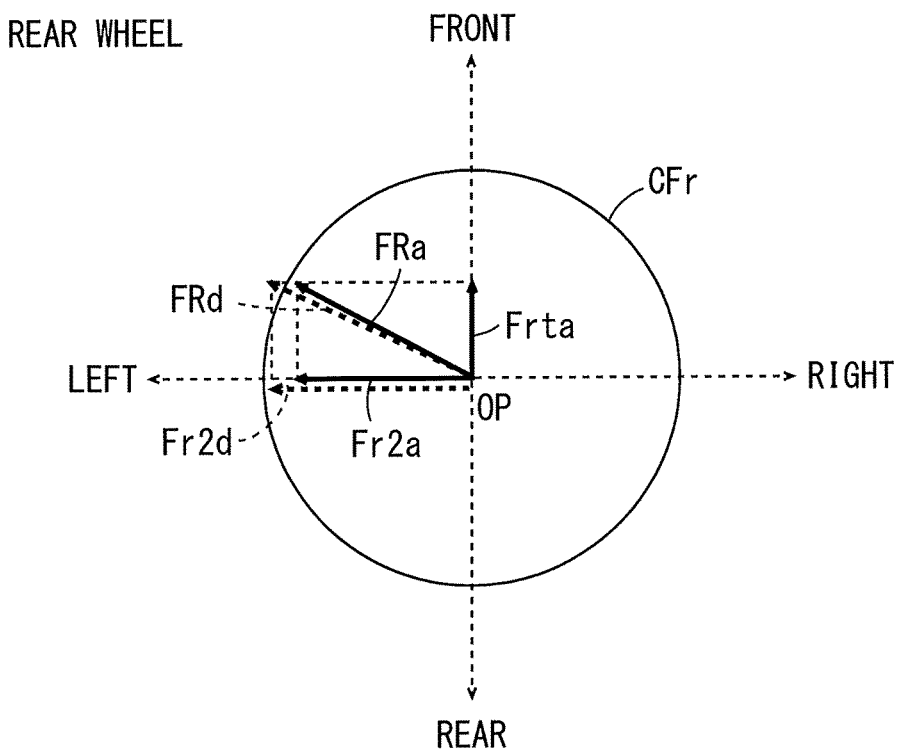

FIGS. 14A and 14B are diagrams for explaining a relation between each of the friction circles CFf, CFr and the wheel force. In FIGS. 14A and 14B, an original point OP is set at the center of each of the friction circles CFf, CFr. One direction of the longitudinal axis (the upward direction in the diagram) indicates the magnitude of the longitudinal force in the forward direction (the driving force), and another direction of the longitudinal axis (the downward direction in the diagram) indicates the magnitude of the longitudinal force in the rearward direction (the braking force), with the original point OP being used as a basis. Further, one direction of the transverse axis (the rightward direction in the diagram) indicates the transverse force in the rightward direction, and another direction of the transverse axis (the leftward direction in the diagram) indicates the transverse force in the leftward direction.

In the examples of FIGS. 14A and 14B, each of transverse force Ff2a, Fr2a in the leftward direction is exerted on each of the front wheel 2 and the rear wheel 3, and driving force Frta is exerted on the rear wheel 3 as the longitudinal force. In this case, the resultant force FRa of the transverse force Ff2a and the driving force Frta is exerted on the rear wheel 3.

As for each of the front wheel 2 and the rear wheel 3, when the resultant force of the longitudinal force and the transverse force is in a range indicated by the friction circle, a grip with respect to the road surface is maintained. In the examples of FIGS. 14A and 14B, the transverse force Ff2a exerted on the front wheel 2 is in a range indicated by the friction circle CFf, and the resultant force FRa exerted on the rear wheel 3 is in a range indicated by the friction circle CFr. Therefore, the grip of each of the front wheel 2 and the rear wheel 3 with respect to the road surface is maintained, and the slip of each of the front wheel 2 and the rear wheel 3 is prevented.

On the other hand, the resultant force of the longitudinal force and the transverse force sometimes exceeds the range indicated by the friction circle due to the change in the transverse force. For example, in FIG. 14B, when the transverse force Fr2a exerted on the rear wheel 3 changes to transverse force Fr2d, resultant force Frd of the transverse force Fr2d and the driving force Frta is exerted on the rear wheel 3. The resultant force FRd exceeds the range indicated by the friction circle CFr. In this case, the grip of the rear wheel 3 may not be maintained, and the rear wheel 3 may slip.

Further, at the time of the acceleration or the deceleration of the motorcycle 100, the inertial force Fi (FIG. 6) is exerted, so that the load movement expressed in the above formula (5) is generated. Thus, each of the up-and-down force Ff3, Fr3 of each of the front wheel 2 and the rear wheel 3 changes.

Figure 15A:
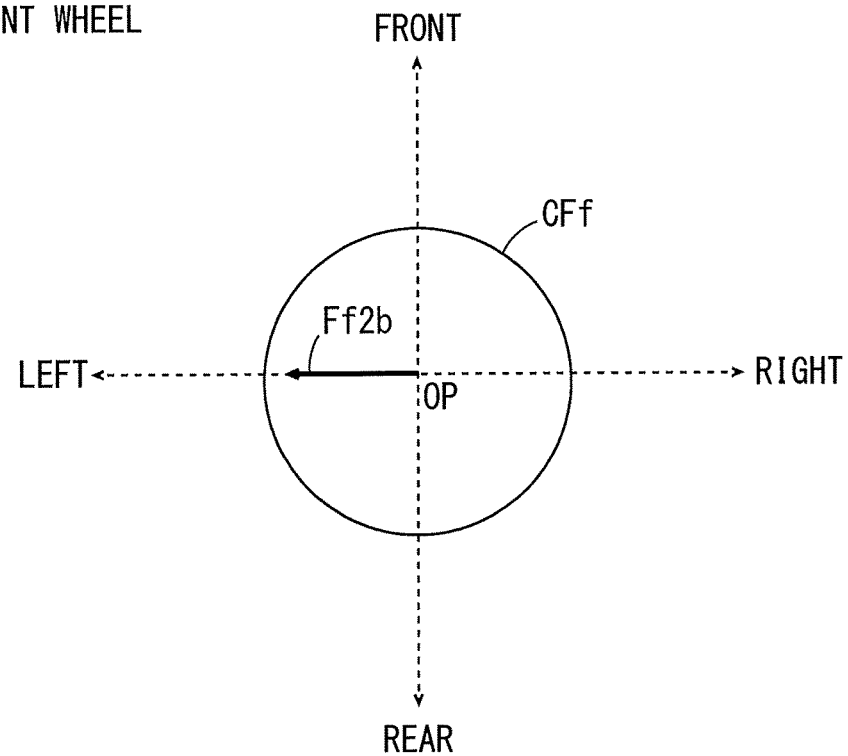
FIGS. 15A and 15B are diagrams showing a change of the friction circle at the time of acceleration of the motorcycle.
Figure 15B:
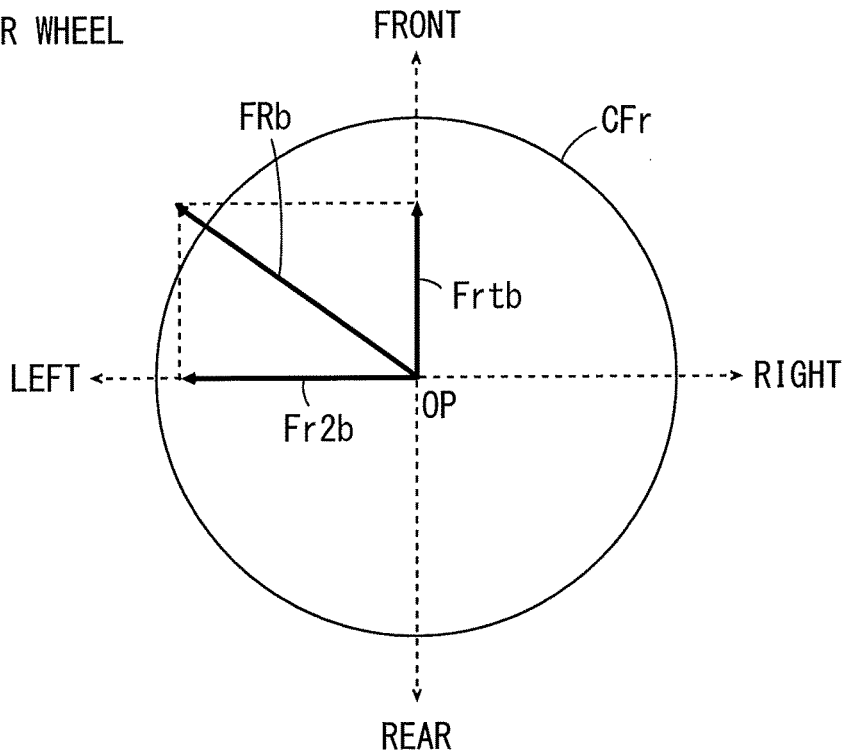
Figure 16A:
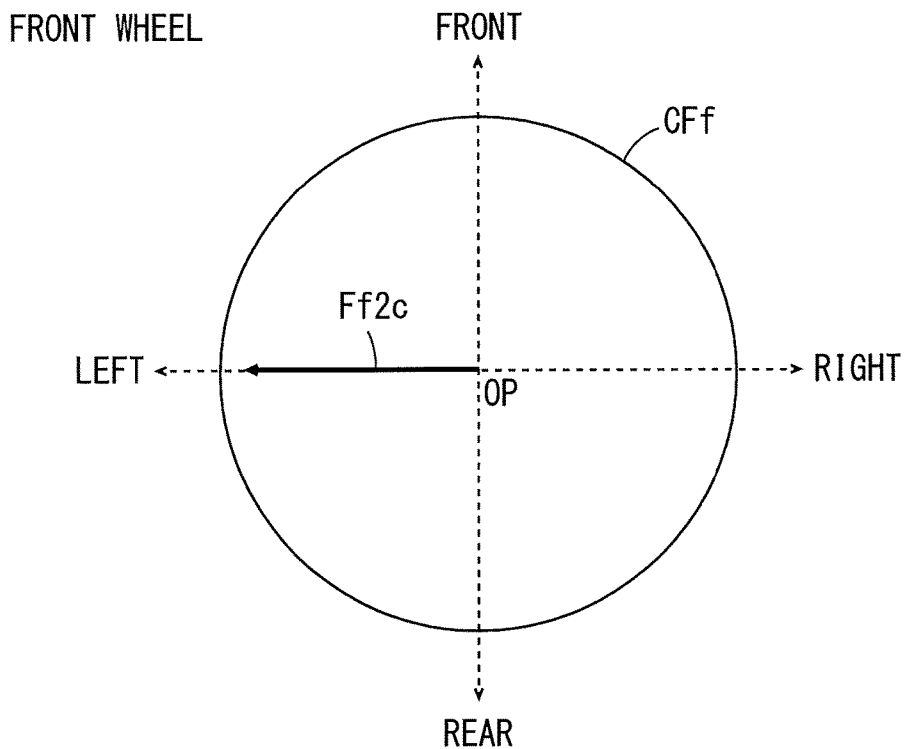
FIGS. 16A and 16B are diagrams for showing a change of the friction circle at the time of deceleration of the motorcycle.
Figure 16B:
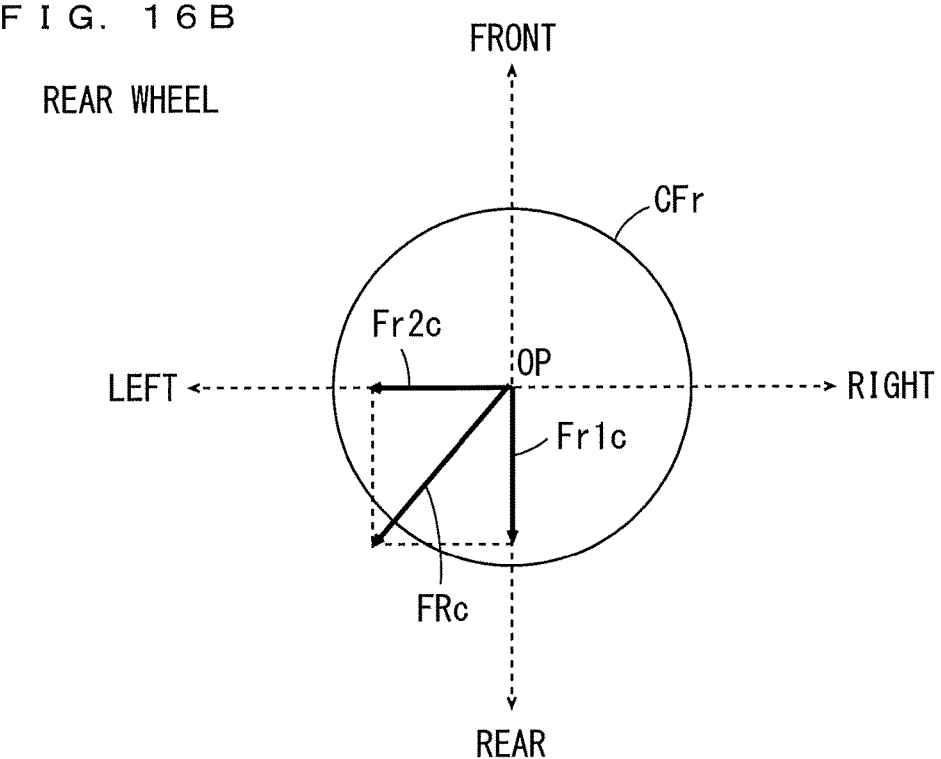

FIGS. 15A and 15B are diagrams showing the changes of the friction circles CFf, CFr at the time of the acceleration of the motorcycle 100. FIGS. 16A and 16B are diagrams showing the changes of the friction circles CFf, CFr at the time of the deceleration of the motorcycle 100.

As described above, at the time of the acceleration of the motorcycle 100, the inertial force Fi (FIG. 6) in the rearward direction is exerted on the movable body 100A, so that the amount of load movement W1 of the above formula (5) is a positive value. Thus, the up-and-down force Ff3 of the front wheel 2 decreases, and the up-and-down force Fr3 of the rear wheel 3 increases. Therefore, as shown in FIGS. 15A and 15B, the size of the friction circle CFf decreases, and the size of the friction circle CFr increases.

In the example of FIGS. 15A and 15B, each of transverse force Ff2b, Fr2b in the leftward direction is exerted on each of the front wheel 2 and the rear wheel 3, and driving force Frtb is exerted on the rear wheel 3 as the longitudinal force. Resultant force FRb of the transverse force Ff2b and driving force Frtb is exerted on the rear wheel 3.

In this case, the resultant force FRb exerted on the rear wheel 3 exceeds the range indicated by the friction force CFr. Therefore, the grip of the rear wheel 3 with respect to the road surface is not maintained, and the rear wheel 3 may slip.

On the other hand, at the time of the deceleration of the motorcycle 100, the inertial force Fi (FIG. 6) in the forward direction is exerted on the movable body 100A. Therefore, the amount of load movement W1 of the above formula (5) is a negative value. Thus, the up-and-down force Ff3 of the front wheel 2 increases, and the up-and-down force Fr3 of the rear wheel 3 decreases. Therefore, as shown in FIGS. 16A and 16B, the size of the friction circle CFf increases, and the size of the friction force CFr decreases.

In the example of FIGS. 16A and 16B, each of transverse force Ff2c, Fr2c in the leftward direction is exerted on each of the front wheel 2 and the rear wheel 3, and braking force Fr1c is exerted on the rear wheel 3 as the longitudinal force. Resultant force FRc of the transverse force Ff2c and the braking force Fr1c is exerted on the rear wheel 3.

In this case, the resultant force FRc exerted on the rear wheel 3 exceeds the range indicated by the friction circle CFr. Therefore, the grip of the rear wheel 3 with respect to the road surface is not maintained, and the rear wheel 3 may slip.

In the present embodiment, the driving force or the braking force that is exerted on the rear wheel 3 is adjusted such that the resultant force of the longitudinal force and the transverse force is in the range indicated by the friction circle as for each of the front wheel 2 and the rear wheel 3.

Specifically, the adjustment of the driving force is performed by the control of the throttle opening, the ignition timing in the engine 5 and the amount of fuel injection. The adjustment of the braking force is performed by the control of the brake 3a or the engine brake.

Figure 17A:
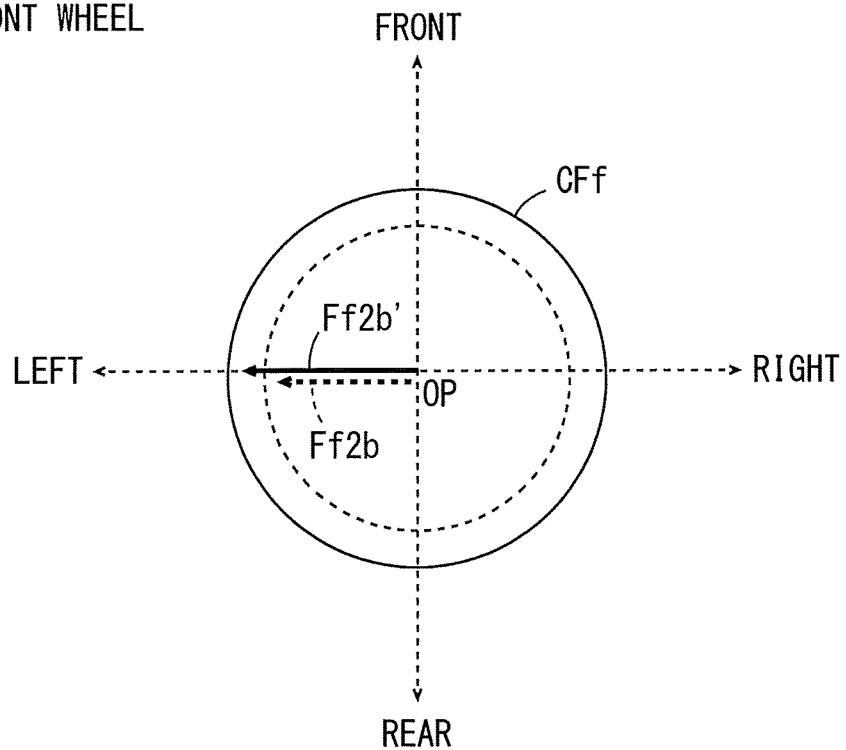
FIGS. 17A and 17B are diagrams for explaining the adjustment of the driving force at the time of the acceleration of the motorcycle.
Figure 17B:
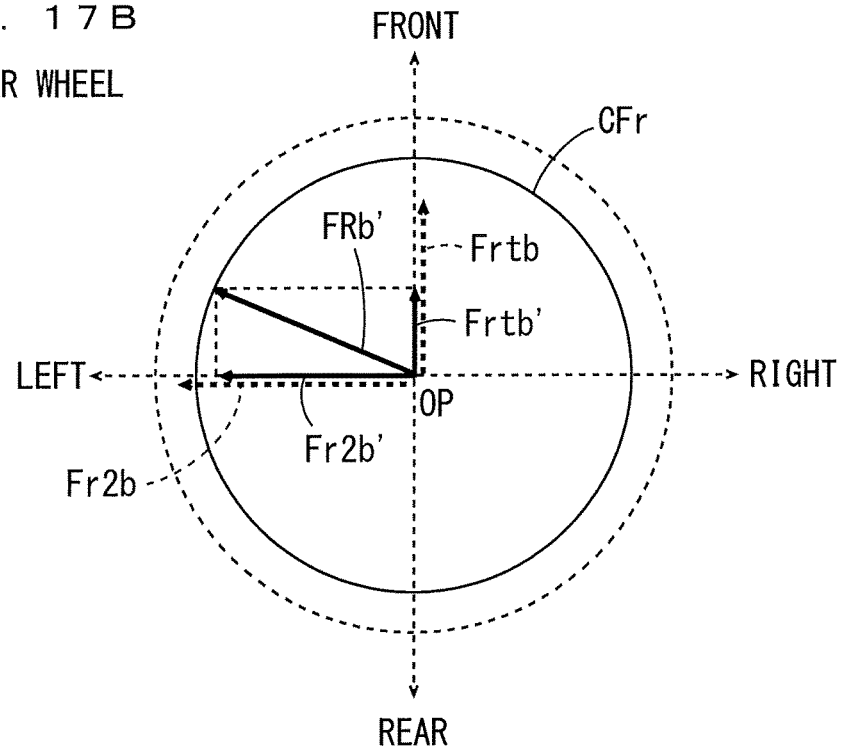

FIGS. 17A and 17B are diagrams for explaining the adjustment of the driving force at the time of the acceleration of the motorcycle 100. In the example of FIGS. 17A and 17B, the driving force Frtb exerted on the rear wheel 3 is decreased to Frtb' as compared to the examples of FIGS. 15A and 15B. In this case, because the acceleration of the motorcycle 100 decreases, the inertial force Fi in the rearward direction exerted on the motorcycle 100 decreases. Thus, the amount of load movement from the front wheel 2 to the rear wheel 3 decreases. Therefore, the up-and-down force Ff3 of the front wheel 2 increases, and the up-and-down force Fr3 of the rear wheel 3 decreases. Therefore, the size of the friction circle CFf increases and the size of the friction circle CFr decreases as compared to the examples of the FIGS. 15A and 15B. Further, the transverse force Ff2b exerted on the front wheel 2 is increased to Ff2b', and the transverse force Fr2b exerted on the rear wheel 3 is decreased to Fr2b'.

Thus, resultant force Frb' of the driving force Frtb' and the transverse force Fr2b' exerted on the rear wheel 3 is in the range indicated by the friction force CFr. As a result, the grip of the rear wheel 3 with respect to the road surface is maintained.

Also in the examples of FIGS. 14A and 14B, it is possible to adjust the resultant force of the driving force and the transverse force exerted on the rear wheel 3 in the range indicated by the friction circle CFr by decreasing the driving force Frta exerted on the rear wheel 3 similarly to the examples of FIGS. 17A and 17B. Thus, the grip of the rear wheel 3 with respect to the road surface can be maintained.

Figure 18A:
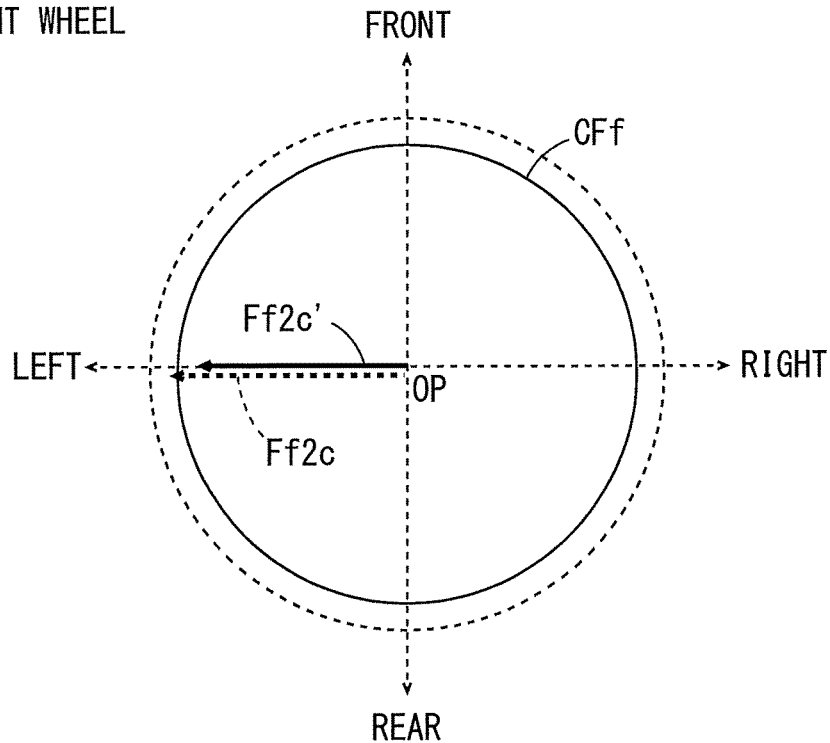
FIGS. 18A and 18B are diagrams for explaining the adjustment of the driving force at the time of the deceleration of the motorcycle.
Figure 18B:
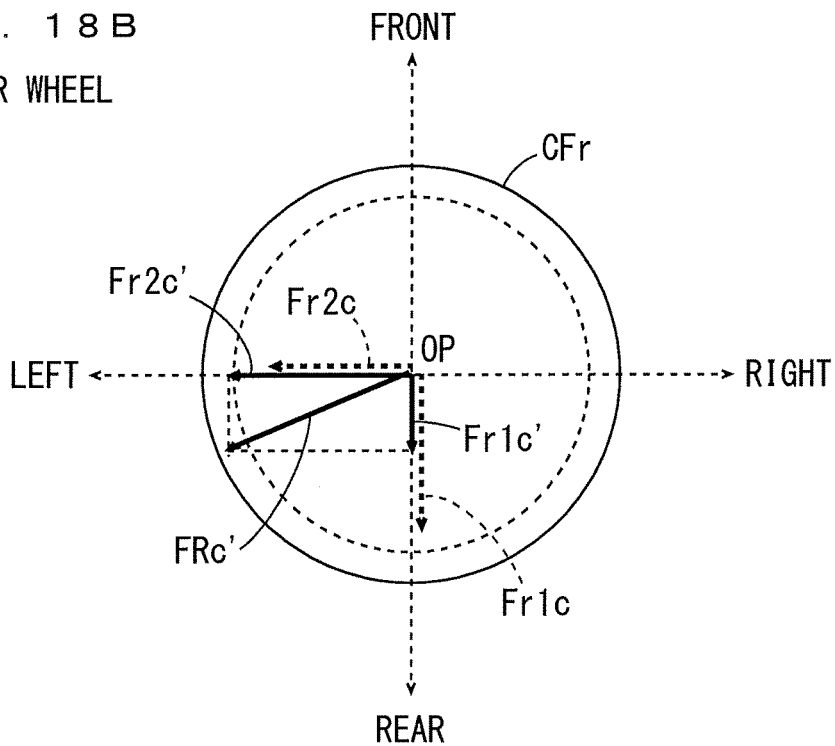

FIGS. 18A and 18B are diagrams for explaining the adjustment of the driving force at the time of the deceleration of the motorcycle 100. In the examples of FIGS. 18A and 18B, the braking force Fr1c exerted on the rear wheel 3 is decreased to Fr1c' as compared to the examples of FIGS. 16A and 16B. In this case, because the deceleration of the motorcycle 100 decreases, the inertial force Fi in the forward direction exerted on the motorcycle 100 decreases. Thus, the amount of load movement from the rear wheel 3 to the front wheel 2 decreases. Therefore, the up-and-down force Ff3 of the front wheel 2 decreases, and the up-and-down force Fr3 of the rear wheel 3 increases. Therefore, the size of the friction circle CFf decreases, and the size of the friction circle CFr increases, as compared to the examples of FIGS. 16A and 16B. Further, the transverse Ff2c exerted on the front wheel 2 is decreased to Ff2c', and the transverse force Fr2c exerted on the rear wheel 3 is increased to Fr2c'.

Thus, the resultant force FRc' of the transverse force Fr2c' and the braking force Fr1c' that are exerted on the rear wheel 3 is in the range indicated by the friction circle CFr. As a result, the grip of the rear wheel 3 with respect to the road surface is maintained.

In the examples of FIGS. 17A and 17B, the engine brake may be generated such that the braking force is exerted on the rear wheel 3, or the brake 3a may be controlled such that the braking force is exerted on the rear wheel 3, instead of the adjustment of the driving force of the rear wheel 3. In this case, the resultant force of the driving force and the braking force is the longitudinal force. Thus, the longitudinal force in the forward direction exerted on the rear wheel 3 can be decreased. Therefore, the resultant force of the longitudinal force and the transverse force that are exerted on the rear wheel 3 can be adjusted in the range indicated by the friction circle CFr similarly to the examples of FIGS. 17A and 17B.

Further, in the examples of FIGS. 18A and 18B, the throttle valve 5a or the engine 5 may be controlled such that the driving force is exerted on the rear wheel 3, instead of the adjustment of the braking force of the rear wheel 3. In this case, the resultant force of the driving force and the braking force is the longitudinal force. Thus, the longitudinal force in the rearward direction exerted on the rear wheel 3 can be decreased. Therefore, the resultant force of the longitudinal force and the transverse force that are exerted on the rear wheel 3 can be adjusted in the range indicated by the friction circle CFr.

(6) Wheel Force Adjustment Process

Figure 19:
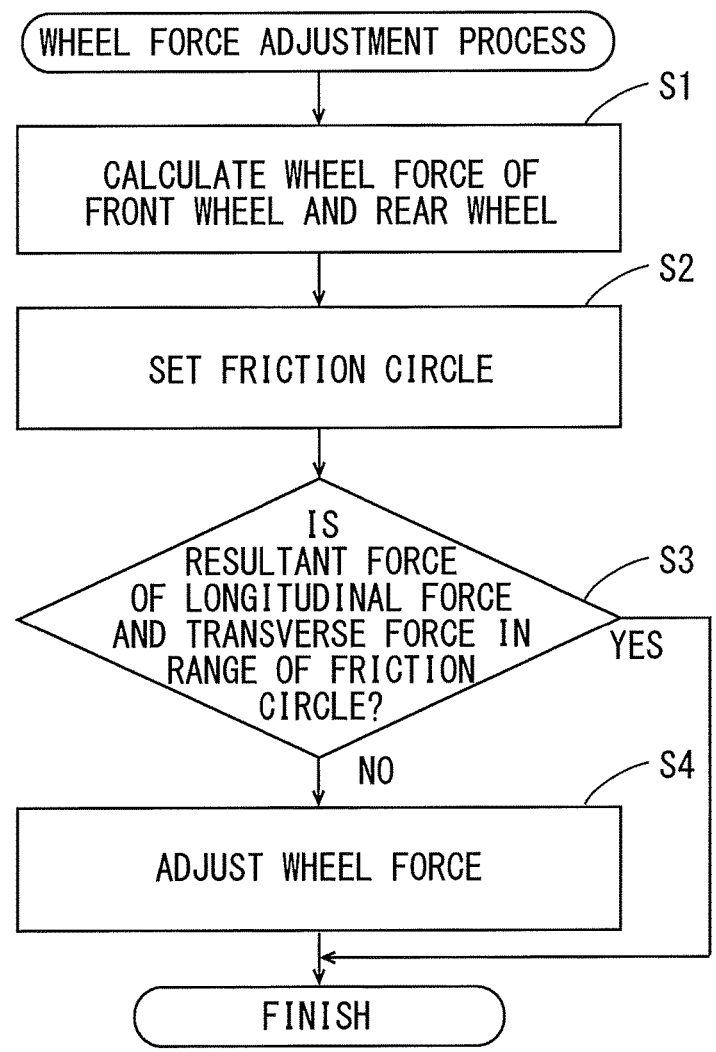
FIG. 19 is a flow chart of a wheel force adjustment process performed by a CPU of FIG. 3.

FIG. 19 is a flow chart of the wheel force adjustment process performed by the wheel force calculator 61, the wheel force corrector 62 and the travel controller 63, of the CPU 51 of FIG. 3. The wheel force adjustment process of FIG. 19 is repeatedly performed in a predetermined period.

As shown in FIG. 19, the wheel force calculator 61 and the wheel force corrector 62 first calculate the longitudinal force, the transverse force and the up-and-down force as the wheel force of each of the front wheel 2 and the rear wheel 3 based on the result of the detection of each type of the sensors SE1 to SE9, respectively (step S1). In this case, the transverse force and the up-and-down force that are calculated by the wheel force calculator 61 are corrected by the wheel force corrector 62 based on the condition of the additional object.

Next, the travel controller 63 sets the friction circles CFf, CFr (FIG. 13) based on the up-and-down force of the front wheel 2 and the rear wheel 3 that are calculated (step S2). Then, the travel controller 63 determines whether or not the calculated resultant force of the longitudinal force and the transverse force of the front wheel 2 is in the range of the set friction circle CFf, and determines whether or not the calculated resultant force of the longitudinal force and the transverse force of the rear wheel 3 is in the range of the set friction circle CFr (step S3).

When the resultant force of the longitudinal force and the transverse force of the front wheel 2 is in the range of the friction circle CFf, and when the resultant force of the longitudinal force and the transverse force of the rear wheel 3 is in the range of the friction circle CFr, the CPU 51 finishes the wheel force adjustment process. On the other hand, as for at least one of the front wheel 2 and the rear wheel 3, when the resultant force of the longitudinal force and the transverse force exceeds the range of the corresponding friction circle, the travel controller 63 adjusts the wheel force of the front wheel 2 and the rear wheel 3 such that the resultant force is in the range of the corresponding friction circle (step S4). In the present example, the driving force or the braking force of the rear wheel 3 is adjusted. Thereafter, the CPU 51 finishes the wheel force adjustment process.

(7) Effects of Embodiments

In the motorcycle 100 according to the present embodiment, the condition of the additional object is estimated based on the result of the detection of each type of sensors SE1 to SE9, and the wheel force of each of the front wheel 2 and the rear wheel 3 is calculated based on the estimated condition of the additional object. Thus, the appropriate wheel force corresponding to the mass and the posture of the additional object and the like is acquired.

Further, in the present embodiment, each of the drag calculation value CdA and the height H2 of the center of aerodynamic force AC is estimated based on the posture (the upper body angle) of the driver 200 in the front-to-rear direction, and the air resistance Fa exerted on the movable body 100A is estimated based on the drag calculation value CdA and the height H2 of the center of aerodynamic force AC that are estimated. Thus, the air resistance Fa can be appropriately found, and the up-and-down force of the front wheel 2 and the rear wheel 3 can be appropriately calculated according to the air resistance Fa.

Further, in the present embodiment, the posture of the driver 200 in the front-to-rear direction is estimated based on the result of the detection of the wheel rotation speed sensor SE1a or the acceleration sensor SE8. Thus, it is possible to easily estimate the posture of the driver 200 in the front-to-rear direction without complicating the configuration.

Further, in the present embodiment, the front-to-rear position and the height H1 of the center of gravity GC of the movable body 100A is estimated based on the mass of the additional object.

Thus, it is possible to easily estimate the front-to-rear position and the height H1 of the center of gravity GC of the movable body 100A without complicating the configuration.

Further, in the present embodiment, the driving force transmitted from the engine 5 to the rear wheel 3 is calculated based on the result of the detection by each of the engine rotation speed sensor SE2, the throttle opening sensor SE3 and the wheel rotation speed sensor 1b, and the mass of the additional object is estimated based on the calculated driving force and the acceleration detected by the acceleration sensor SE8. Thus, it is possible to easily estimate the mass of the additional object without complicating the configuration.

Further, in the present embodiment, the height H1 of the center of gravity GC of the movable body 100A is estimated based on the transverse posture of the driver 200, and the transverse force of each of the front wheel 2 and the rear wheel 3 is calculated based on the estimated height H1 of the center of gravity GC. Thus, at the time of the turning of the movable body 100A, in a case in which the motorcycle 100 tilts, the transverse force of each of the front wheel 2 and the rear wheel 3 can be appropriately calculated according to the transverse posture of the driver 200.

Further, in the present embodiment, the type of the road surface is estimated based on the result of the detection of each of the stroke sensors SE4, SE5 and the acceleration sensor SE8, and the transverse posture of the driver 200 is estimated based on the estimated type of the road surface. Thus, it is possible to easily estimate the transverse posture of the driver 200 without complicating the configuration.

Further, in the present embodiment, the friction circle is set based on the calculated up-and-down force, and the travel of the motorcycle 100 is controlled such that the calculated resultant force of the longitudinal force and the transverse force does not exceed the range indicated by the friction circle. In this case, the travel control using the friction circle is performed based on the appropriate longitudinal force, transverse force and up-and-down force that are corresponding to the condition of the additional object. Thus, the grip of each of the front wheel 2 and the rear wheel 3 can be appropriately maintained.

(8) Other Embodiments (8-1)

While the travel control of the motorcycle 100 is performed based on the calculated vehicle force in the above-mentioned embodiment, the invention is not limited to this. For example, the information for assisting or supporting the driving of the driver 200 (the auxiliary information) may be displayed in the display 46 (FIG. 2) based on the calculated wheel force. In this case, the driving force or the braking force of the rear wheel 3 is not adjusted by the CPU 51, but the driver 200 adjusts the driving force or the braking force of the rear wheel 3 based on the auxiliary information displayed in the display 46. Thus, a decrease in the driving feeling due to the automatic control is prevented.

As the auxiliary information, for example, the relation between the friction circle and the wheel force as shown in FIGS. 14A to 16B may be displayed, or the numerical value indicating the wheel force may be displayed. Alternatively, when the wheel force comes close to a critical value of the range indicated by the friction circle, the alarm indicating that may be displayed. Further, the auxiliary information may be delivered visually or aurally to the driver 200 by sound, vibration or the like.

The auxiliary information may be transmitted from the motorcycle 100 to an external device by wired or wireless connection. For example, the auxiliary information may be transmitted to a mobile apparatus such as a mobile phone or a tablet terminal, and the auxiliary information may be displayed on the screen of its mobile apparatus. Alternatively, in a racetrack and the like, the auxiliary information may be transmitted from the motorcycle 100 that is travelling on a racecourse to a maintenance facility (a pit) and the like.

(8-2)

While the condition of the additional object is estimated based on the result of the detection by each type of the sensors SE1 to SE9 in the above-mentioned embodiment, the invention is not limited to this. For example, the number, the mass, the posture or the like of the rider may be entered in the ECU 50 as the condition of the additional object by the operation of the display 46 by the driver 200. In this case, it is possible to easily perform the calculation of the wheel force based on the entered condition of the additional object.

(8-3)

While the determination whether or not the road surface is poor is performed based on the result of the detection by each of the stroke sensor SE4, SE5 in the above-mentioned embodiment, the present determination may be performed by another method. When the road surface is poor, variations are likely to be generated between the rotation speed of the front wheel 2 and the rotation speed of the rear wheel 3. Thus, it is possible to perform the determination whether or not the road surface is poor by comparing the rotation speed of each of the front wheel 2 and the rear wheel 3 detected by each of the wheel rotation speed sensors SE1 a, SE1b.

Further, the type of the road surface on which the motorcycle 100 is travelling may be acquired using the GPS. Alternatively, the type of the road surface on which the motorcycle 100 is travelling may be entered in the ECU 50 by the operation of the display 46 by the driver 200. In this case, the transverse posture of the driver 200 can be easily estimated based on the type of the road surface that is acquired or entered.

(8-4)

While the mass of the additional object is estimated by the above formula (9) based on the calculated longitudinal force and the result of the detection by the acceleration sensor SE8, the mass of the additional object may be estimated by another method. For example, the load applied to each of the front wheel 2 and the rear wheel 3 may be calculated based on the result of the detection by each of the stroke sensors SE4, SE5, and the mass of the additional object may be estimated based on the calculated load and the result of the detection by the acceleration sensor SE8.

(8-5)

While the rear wheel 3 is driven by the engine 5 in the above-mentioned embodiment, the invention is not limited to this. The front wheel 2 may be driven by the engine 5. Further, the wheel force may be calculated only for the wheel that is driven by the engine 5 out of the front wheel 2 and the rear wheel 3, or the wheel force may be calculated for the wheel that is not driven by the engine 5.

(8-6)

While each of the functions of the wheel force calculator, the wheel force corrector and a movement controller is realized by the CPU 51 of the ECU 50 and the control program in the above-mentioned embodiment, at least part of the functional unit of the wheel force calculator, the wheel force corrector and the movement controller may be realized by the hardware such as an electronic circuit.

(8-7)

While the above-mentioned embodiment is an example in which the present invention is applied to the motorcycle, the invention is not limited to this. The present invention may be applied to another saddle-straddling type motor vehicle such as a motor tricycle, an ATV (All Terrain Vehicle) or the like.

(8-8)

While the above-mentioned embodiment is an example in which the present invention is applied to a vehicle including an engine as a motor, the invention is not limited to this. The present invention may be applied to an electric vehicle including an electric motor as a motor.

(9) Correspondences Between Constituent Elements in Claims and Parts in Preferred Embodiments In the following paragraphs, non-limiting examples of correspondences between various elements recited in the claims below and those described above with respect to various preferred embodiments of the present invention are explained.

In the present embodiment, the motorcycle 100 is an example of a saddle-straddling type motor vehicle, the main body 1 is an example of a main body, the front wheel 2 or the rear wheel 3 is an example of a wheel, the engine 5 is an example of a motor, the wheel force calculator 61 is an example of a wheel force calculator, the wheel force corrector 62 is an example of a wheel force corrector.

Further, the acceleration sensor SE8 is an example of an acceleration detector, the wheel rotation speed sensor SE1a is an example of a vehicle speed detector, the display 46 is an example of a posture entry unit and a mass entry unit, the engine rotation speed sensor SE2, the throttle opening sensor SE3 and the wheel rotation speed sensor SE1b are examples of a driving force detector, the stroke sensors SE4, SE5 are examples of a load detector and a road surface information acquirer, and the travel controller 63 is an example of a movement controller.

As each of constituent elements recited in the claims, various other elements having configurations or functions described in the claims can be also used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

INDUSTRIAL APPLICABILITY

The present invention can be effectively utilized for various saddle-straddling type motor vehicles.

I claim:

1. A saddle-straddling type motor vehicle, comprising:
a main body having a wheel;
a motor that generates driving force for moving the main body;
a wheel force calculator configured to calculate wheel force exerted between the wheel and a surface of a road on which the motor vehicle is traveling; and
a wheel force corrector configured to correct the wheel force calculated by the wheel force calculator based on a posture of a rider of the motor vehicle in a front-to-rear direction, wherein
the wheel force corrector is configured to estimate air resistance based on the posture of the rider in the front-to-rear direction, and to correct the calculated wheel force based on the estimated air resistance.

2. The saddle-straddling type motor vehicle according to claim 1, wherein
the wheel force corrector is configured to estimate a height of a center of aerodynamic force based on the posture of the rider in the front-to-rear direction, and to correct the calculated wheel force based on the estimated height of the center of aerodynamic force and the estimated air resistance.

3. The saddle-straddling type motor vehicle according to claim 1, further comprising an acceleration detector that detects acceleration of the main body, wherein
the wheel force corrector is configured to estimate the posture of the rider in the front-to-rear direction based on the acceleration detected by the acceleration detector, and to correct the calculated wheel force based on the estimated posture of the rider in the front-to-rear direction.

4. The saddle-straddling type motor vehicle according to claim 1, further comprising a vehicle speed detector that detects a speed of the main body, wherein
the wheel force corrector is configured to estimate the posture of the rider in the front-to-rear direction based on the speed detected by the vehicle speed detector, and to correct the calculated wheel force based on the estimated posture of the rider in the front-to-rear direction.

5. The saddle-straddling type motor vehicle according to claim 1, further comprising a posture entry unit in which the posture of the rider in the front-to-rear direction is entered, wherein
the wheel force corrector is configured to correct the calculated wheel force based on the posture of the rider in the front-to-rear direction that is entered in the posture entry unit.

6. The saddle-straddling type motor vehicle according to claim 1, wherein
the condition of the object includes the mass of the object, and
the wheel force corrector is configured to correct the calculated wheel force based on the mass of the object.

7. The saddle-straddling type motor vehicle according to claim 6, wherein the wheel force corrector is configured to estimate a position of a center of gravity of an entirety including the saddle-straddling type motor vehicle and the object loaded thereon based on the mass of the object, and to correct the calculated wheel force based on the estimated position of the center of gravity.

8. The saddle-straddling type motor vehicle according to claim 6, further comprising:
a driving force detector that detects the driving force generated by the motor; and
an acceleration detector that detects acceleration of the main body, wherein
the wheel force corrector is configured to estimate the mass of the object based on the driving force detected by the driving force detector and the acceleration detected by the acceleration detector, and to correct the calculated wheel force based on the estimated mass of the object.

9. The saddle-straddling type motor vehicle according to claim 6, further comprising:
a load detector that detects a load applied to the wheel; and
an acceleration detector that detects acceleration of the main body, wherein
the wheel force corrector is configured to estimate the mass of the object based on the load detected by the load detector and the acceleration detected by the acceleration detector, and to correct the calculated wheel force based on the estimated mass of the object.

10. The saddle-straddling type motor vehicle according to claim 6, further comprising a mass entry unit in which the mass of the object is entered, wherein
the wheel force corrector corrects the calculated wheel force based on the mass of the object entered in the mass entry unit.

11. The saddle-straddling type motor vehicle according to claim 1, wherein
the main body includes a body frame,
the wheel includes a front wheel and a rear wheel,
a center of the body frame in a width direction thereof, a center of the front wheel in a width direction thereof and a center of the rear wheel in a width direction thereof define a plane that is a vehicle center surface, and
the front-to-rear direction is a rearward direction parallel to the vehicle center surface and a horizontal plane.

12. The saddle-straddling type motor vehicle according to claim 1, wherein
the object includes a rider,
the condition of the object includes a posture of the rider in a transverse direction, and
the wheel force corrector is configured to estimate a position of a center of gravity of an entirety including the saddle-straddling type motor vehicle and the object loaded thereon based on the posture of the rider in the transverse direction, and to correct the calculated wheel force based on the estimated position of the center of gravity.

13. The saddle-straddling type motor vehicle according to claim 12, further comprising:
a road surface information acquirer that is configured to acquire road surface information regarding the surface of the road, wherein
the wheel force corrector is configured to estimate the posture of the rider in the transverse direction based on the road surface information acquired by the road surface information acquirer, and to correct the calculated wheel force based on the estimated posture of the rider in the transverse direction.

14. The saddle-straddling type motor vehicle according to claim 12, wherein
the main body includes a body frame,
the wheel includes a front wheel and a rear wheel,
a center of the body frame in a width direction thereof, a center of the front wheel in a width direction thereof and a center of the rear wheel in a width direction thereof define a plane that is a vehicle center surface, and
the transverse direction is a direction perpendicular to the vehicle center surface.

15. The saddle-straddling type motor vehicle according to claim 1, wherein
the wheel force corrector is configured
to estimate a bank angle of an entirety including the saddle-straddling type motor vehicle and the rider thereon, and an amount of load movement in the entirety including the saddle-straddling type motor vehicle and the rider thereon, and
to correct the calculated wheel force based on the bank angle and the amount of load movement that are estimated.

16. A saddle-straddling type motor vehicle on which an object is loadable for traveling with the motor vehicle, comprising:
a main body having a wheel;
a motor that generates driving force for moving the main body;
a wheel force calculator configured to calculate wheel force exerted between the wheel and a surface of a road on which the motor vehicle is traveling; and
a wheel force corrector configured to correct the wheel force calculated by the wheel force calculator based on a condition of the object on the motor vehicle, wherein
the wheel force calculator is configured to calculate perpendicular force exerted in a direction perpendicular to the surface of the road, and horizontal force exerted in a direction parallel to the surface of the road, to thereby obtain the wheel force, and
the saddle-straddling type motor vehicle further includes a movement controller that is configured to set a friction circle based on perpendicular force of the corrected wheel force, and to control a movement of the main body such that horizontal force of the corrected wheel force does not exceed a range indicated by the friction circle.

17. A wheel force acquisition device for acquiring wheel force of a saddle-straddling type motor vehicle, comprising:
a wheel force calculator configured to calculate wheel force exerted between a wheel of the saddle-straddling type motor vehicle and a surface of a road on which the motor vehicle is traveling, and
a wheel force corrector configured to correct the wheel force calculated by the wheel force calculator based on a posture of a rider of the motor vehicle in a front-to-rear direction, wherein
the wheel force corrector is configured to estimate air resistance based on the posture of the rider in the front-to-rear direction, and to correct the calculated wheel force based on the estimated air resistance.

\* \* \* \* \*